(12) United States Patent
Sanchez Ribes et al.

(10) Patent No.: US 11,014,286 B2
(45) Date of Patent: May 25, 2021

(54) THREE-DIMENSIONAL OBJECT GENERATION

(71) Applicant: HEWLETT-PACKARD DEVELOPMENT COMPANY, L.P., Fort Collins, CO (US)

(72) Inventors: Salvador Sanchez Ribes, Barcelona (ES); Hector Lebron, San Diego, CA (US); Juan J Hernandez, San Diego, CA (US); Emilio Carlos Cano, San Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 133 days.

(21) Appl. No.: 16/317,783

(22) PCT Filed: Oct. 19, 2016

(86) PCT No.: PCT/US2016/057737
§ 371 (c)(1),
(2) Date: Jan. 14, 2019

(87) PCT Pub. No.: WO2018/075035
PCT Pub. Date: Apr. 26, 2018

(65) Prior Publication Data
US 2019/0263051 A1 Aug. 29, 2019

(51) Int. Cl.
*B29C 64/106* (2017.01)
*B29C 64/264* (2017.01)
(Continued)

(52) U.S. Cl.
CPC ............ *B29C 64/106* (2017.08); *B29C 35/16* (2013.01); *B29C 64/165* (2017.08);
(Continued)

(58) Field of Classification Search
CPC ... B29C 64/106; B29C 64/264; B29C 64/209; B29C 64/165; B29C 64/205;
(Continued)

(56) References Cited

U.S. PATENT DOCUMENTS 5,017,941 A 5/1991 Drake
5,992,963 A 11/1999 Miyake et al.
(Continued)

FOREIGN PATENT DOCUMENTS

CN 101918198 12/2010
CN 103842157 6/2014
(Continued)

OTHER PUBLICATIONS

Williams, C.B., Design and Development of a Layer-Based Additive Manufacturing Process for the Realization of Metal Parts of Designed Mesostructure, Apr. 2008, <https://smartech.gatech.edu/bitstream/handle/1853/22687/Williams_Christopher_B_200804_phd.pdf>.

*Primary Examiner* — Joseph S Del Sole
*Assistant Examiner* — Lawrence D. Hohenbrink, Jr.
(74) *Attorney, Agent, or Firm* — Middleton Reutlinger

(57) ABSTRACT

An apparatus and method for generating a three-dimensional object. The apparatus includes a build material area, at least one agent distributor with a fluid reservoir to store fluid agent and at least one fluid ejection die to selectively eject fluid agent in the build material area. A cooling system to remove heat from the at least one fluid ejection die has a heat sink. The at least one fluid ejection die is in thermal contact with the heat sink via the fluid agent of the fluid reservoir.

15 Claims, 14 Drawing Sheets

(51) Int. Cl.
*B29C 64/205* (2017.01)
*B29C 35/16* (2006.01)
*F28D 1/02* (2006.01)
*F28D 1/06* (2006.01)
*B29C 64/209* (2017.01)
*B29C 64/165* (2017.01)
*B33Y 10/00* (2015.01)
*B33Y 30/00* (2015.01)
*B33Y 40/00* (2020.01)
*B29C 64/20* (2017.01)
*B29C 64/255* (2017.01)

(52) U.S. Cl.
CPC .......... *B29C 64/205* (2017.08); *B29C 64/209* (2017.08); *B29C 64/264* (2017.08); *F28D 1/0213* (2013.01); *F28D 1/06* (2013.01); *B29C 64/20* (2017.08); *B29C 64/255* (2017.08); *B29C 2035/1616* (2013.01); *B29C 2035/1625* (2013.01); *B29C 2035/1658* (2013.01); *B33Y 10/00* (2014.12); *B33Y 30/00* (2014.12); *B33Y 40/00* (2014.12); *F28D 2001/0286* (2013.01)

(58) Field of Classification Search
CPC ....... B29C 64/20; B29C 64/255; B29C 35/16; B29C 2035/1616; B29C 2035/1625; B29C 2035/1658; B33Y 10/00; B33Y 30/00; B33Y 40/00; F28D 1/0213; F28D 1/06; F28D 2001/0286
USPC .................................................. 425/472, 375
See application file for complete search history.

(56) References Cited

U.S. PATENT DOCUMENTS

| | | | |
|---|---|---|---|
| 6,454,972 B1 * | 9/2002 | Morisette | B29C 64/118 264/39 |
| 6,623,094 B2 | 9/2003 | Murakami | |
| 8,500,232 B2 | 8/2013 | Suh | |
| 9,162,453 B2 | 5/2015 | Cruz-Uribe et al. | |
| 2015/0190963 A1 | 7/2015 | Lee et al. | |
| 2015/0266238 A1 * | 9/2015 | Ederer | B29C 64/153 264/460 |
| 2016/0263827 A1 | 9/2016 | Fripp et al. | |

FOREIGN PATENT DOCUMENTS

| | | |
|---|---|---|
| CN | 104718063 | 6/2015 |
| CN | 204431738 U | 7/2015 |
| CN | 205467371 | 8/2016 |
| RU | 2513065 C2 | 4/2014 |
| WO | WO-2009138859 A3 | 11/2009 |
| WO | WO-2011144580 | 11/2011 |

* cited by examiner

THREE-DIMENSIONAL OBJECT GENERATION

BACKGROUND

Additive manufacturing systems that generates three-dimensional (3D) objects on a layer-by-layer basis are used for producing three-dimensional objects. Examples of additive manufacturing systems include three-dimensional printing systems. The generation of three-dimensional objects by additive manufacturing systems may be affected by the type of additive manufacturing technology used and by heat dissipation during the manufacturing process.

BRIEF DESCRIPTION OF THE DRAWINGS

Features and advantages of examples will be described, by way of example only, in the following detailed description with reference to the accompanying drawings which like reference numerals correspond to similar, though perhaps not identical, components. For the sake of brevity, reference numerals or features having a previously described function may or may not be described in connection with other drawings in which they appear.

Figure 1:
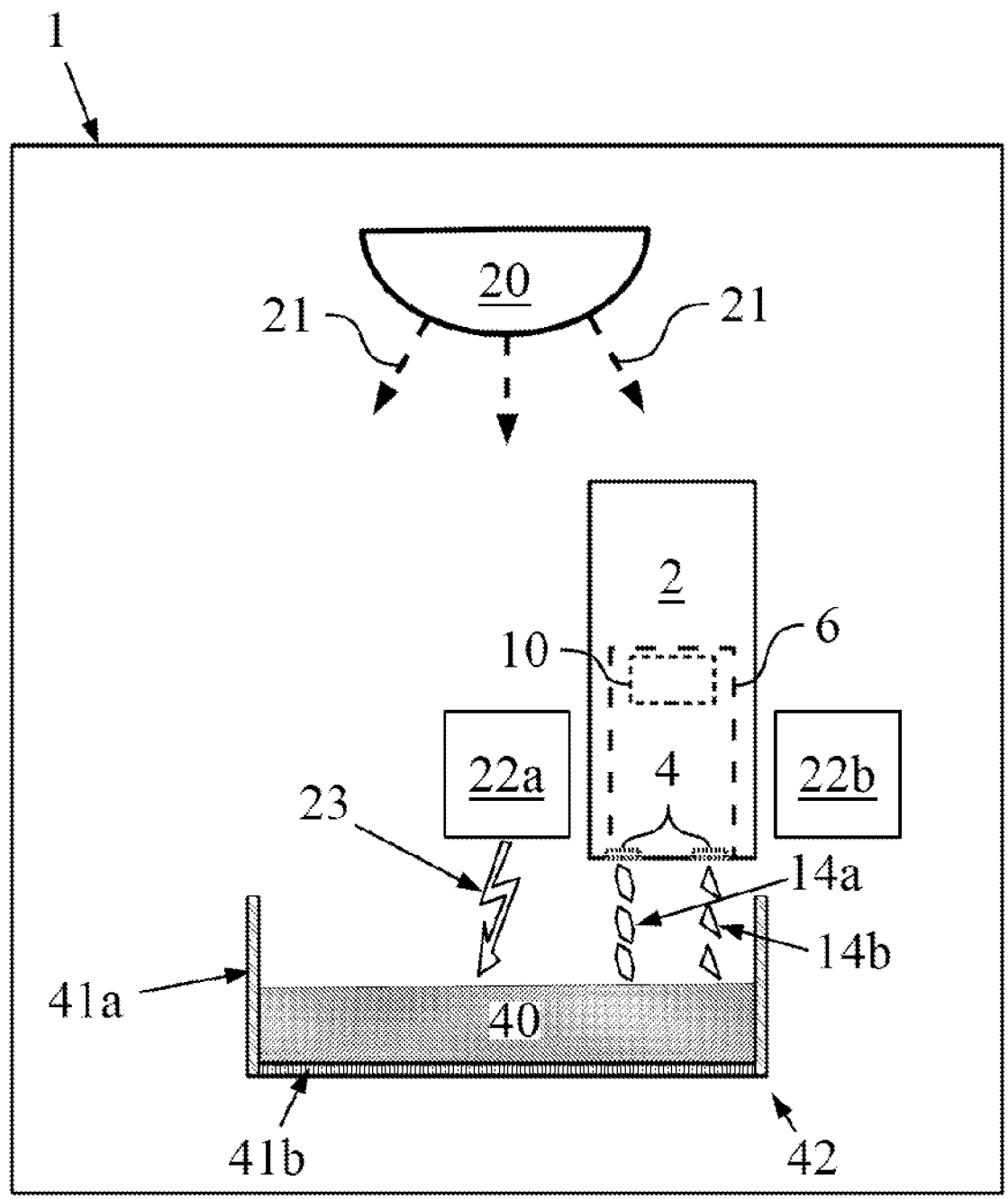
FIG. 1 provides a schematic view of an additive manufacturing apparatus, according to an example, for generating a three-dimensional (3D) object from build material.

Throughout the drawings, identical reference numbers designate but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Examples provided herein include apparatuses, processes, and methods for cooling during generation of three-dimensional objects. Apparatuses for generating three-dimensional objects may be referred to as additive manufacturing apparatuses. As will be appreciated, example apparatuses described herein may correspond to three-dimensional printing systems, which may also be refereed to as three-dimensional printers. In an example additive manufacturing process, a layer of build material may be distributed in a build material area, a fusing agent may be selectively distributed on the layer of build material, and fusing energy may be temporarily applied to the layer of build material. As used herein, a build layer may refer to a layer of build material distributed in a build material area upon which agent may be distributed and/or energy may be applied.

In some examples an apparatus may comprise at least one energy source that may heat a build material layer such that portions of the build material layer where agent has been distributed may fuse. In some examples, apparatuses may further comprise additional energy sources with which to pre-heat build material layers.

The temperature of build material in the build material area may be increased prior to an additive manufacturing process by a first application of energy. The temperature of the build material may be raised to a temperature below a start of coalescing or fusing processes in the build material even when the build material is moistened with a fusing agent. In some examples, energy may be applied to the build material area with at least one energy source of an example apparatus. Examples of energy sources may comprise a heating element, electromagnetic radiation emitter (e.g., light emitter, infrared emitter, ultraviolet emitter, laser emitter, etc.), and/or a lamp (e.g., a halogen lamp).

In addition, example apparatus may comprise an agent distributor. An increased ambient temperature of the print material area may also cause a temperature rise in an agent distributor of the additive manufacturing apparatus. Furthermore, the agent distributor may comprise at least one fluid ejection die. In some examples, the at least one fluid ejection die may consist of silicon and may comprise a plurality of nozzles for ejecting fluid agent. At least one fluid ejection die of the agent distributor may be located above the print material area. The at least one fluid ejection die and the build material area may be spaced apart a small distance. The distance may be in the range of approximately one to five millimeters.

For continuous operation of the additive manufacturing apparatus, i.e. for a prolonged manufacturing process of objects in a centimeter or meter scale, some examples a cooling system for removing heat from the fluid ejection die during the manufacturing process might be used. A temperature rise in fluid ejection dies might cause an interruption of the manufacturing process due to safety measures of the additive manufacturing apparatus.

In some examples, the cooling system comprises a heat sink. In some, examples, the heat sink comprises a cooling circuit. In some examples, the cooling circuit comprises circulating cooling fluid. In some examples the cooling fluid maybe a liquid, e.g. a refrigerated coolant like deionized water or water with additives such as ethylene glycol, diethylene glycol, or propylene glycol. In some examples, the cooling fluid may be a gas, e.g. high pressured air, hydrogen, or sulfur hexafluoride. In some examples, the cooling fluid may be cooled by a Peltier element, a heat exchanger, or the like. In some examples, the cooling fluid may be in an open loop flow, i.e. a continuous supply of fresh cooling fluid, e.g. water from a faucet, may be provided to cool the agent distributor and the fluid ejection dies therein.

In some examples, the cooling fluid may have at least one of the following properties: high thermal capacity, low viscosity, is non-toxic, is chemically inert, neither causes nor promote corrosion of the cooling system, and is an electrical insulator.

In some examples, the cooling circuit may comprise at least one of a passivation and an insulation.

In some examples, a material high heat capacity, e.g. with an isobaric molar heat capacity above $20$ $J \cdot mol^{-1} \cdot K^{-1}$, may be used for the heat sink. In some examples, the heat sink may comprise a heat conducting body, e.g. a metal plate. In some examples, the metal body may comprise a plurality of cooling fins, e.g. metal fins attached to a heat conducting plate or a metal plate with fins formed from a single piece. In some examples, the metal body may be a copper plate. In some examples, the heat sink maybe cooled a by circulating coolant of a coolant circuit connected to the heat sink. In some examples, the coolant of the coolant circuit may be the cooling fluid of the cooling circuit.

A second application of energy may cause portions of the layer of build material to which fusing agent has been applied to coalesce or fuse. In contrast, build material upon winch agent was not distributed may not coalesce or fuse due to the second application of energy. In some examples, enemy may be applied to a build layer with at least one energy source of an example apparatus. Examples of energy sources may comprise a heating element, electromagnetic radiation emitter (e.g., light emitter, infrared emitter, ultraviolet emitter, laser emitter, etc.), and/or a lamp (e.g., a halogen lamp).

The temperature at which portions of the layer of build material may begin to coalesce or fuse may be referred to as a fusing temperature. Upon cooling, portions of the build material layer that have coalesced become solid and form part of a three-dimensional object being generated. Accordingly, the portions of the build material layer upon which agent is selectively distributed (and which become solid) may be referred to as the "part area" of the build layer.

Additional layers may be formed and the operations described above may be performed for each layer to thereby generate a three-dimensional object. As will be appreciated, a part area of each layer may correspond to a cross-section of a three-dimensional object to be formed. Sequentially layering and fusing portions of layers of build material on top of previous layers may facilitate generation of the three-dimensional object. The layer-by-layer formation of a three-dimensional object may be referred to as a layer-wise additive manufacturing process. In some examples, a height of a build layer (which may also be referred to as thickness) may be in the micron scale. For example, some example build layer heights may be in the range of approximately 60 to approximately 150 microns. Furthermore, an overall build height of the cumulative layers of build material may be in the centimeter or meter scale depending on the apparatus and process implemented.

In examples described herein, a build material may include a powder-based build material, where powder-based build material may comprise wet and/or dry powder-based materials, particulate materials, and/or granular materials. In some examples, the build material may be a weak light absorbing polymer. In some examples, the build material may be a thermoplastic. Furthermore, as described herein, agent may comprise fluids that may facilitate fusing of build material when energy is applied. In some examples, agent may be referred to as coalescing or fusing agent. In some examples, agent may be a light absorbing liquid, an infrared or near infrared absorbing liquid, such as a pigment colorant.

As will be appreciated, various types of build materials may have differing material properties. Performance of various operations of a layer-wise additive manufacturing process as described herein may be based at least in part on material properties of a build material used in such process. Example material properties may include critical temperature (e.g., a temperature corresponding to a critical point that is an end point of a phase equilibrium), emissivity, absorbance, thermal conductivity, thermal diffusivity, thermal expansion, photosensitivity, reflectivity, melting point, coefficient of thermal expansion, plasticity, elasticity, permeability, reactivity, surface energy, electrical conductivity, permittivity, and/or other such material properties.

In some examples, an apparatus may comprise, or may receive, a build material support, where a surface of the build material support may correspond to a build material area. Accordingly, a starting layer of build material may be distributed on the surface of the build material support in the build material area. Subsequent layers of build material may be formed in the build material area on previously formed and processed layers.

In some examples, an agent distributor may comprise a printhead or printheads (e.g., a thermal ejection based printhead, a piezoelectric ejection based printhead, etc.). An agent distributor may be coupled to a scanning carriage, and the scanning carriage may move along a scanning axis over the build material area. In one example, printheads suitable for implementation in commercially available inkjet printing devices may be implemented as an agent distributor. In other examples, an agent distributor may comprise other types of fluid ejection devices that selectively eject small volumes of fluid. In some examples, an agent distributor may comprise at least one printhead that comprises a plurality of fluid ejection dies arranged generally end-to-end along a width of the agent distributor. In some examples, the at least one printhead may comprise a plurality of printheads arranged generally end-to-end along a width of the agent distributor. In such examples, a width of the agent distributor may correspond to a dimension of a build material area. For example, a width of the agent distributor may correspond to a width of a build material area. As will be appreciated, an agent distributor may selectively distribute agent on a build layer in the build material area concurrent with movement of the scanning carriage over the build area.

In some examples, apparatuses may comprise a build material distributor to distribute build material in the build area. A build material distributor may comprise, for example, a wiper blade, a roller, and/or a spray mechanism. In some examples, a build material distributor may be coupled to a scanning carriage. In these examples, the build material distributor may distribute build material in the build area as the scanning carriage moves over the build area along the scanning axis to thereby distribute a layer of build material in the build area.

Furthermore, in some examples described herein, a first build layer of build material and a second build layer of build material may be described. It will be appreciated that "first" and "second" are merely used for illustrative purposes. For consistency, some examples provided herein describe a topmost build layer of build material as a second build layer, and examples describe a build layer upon which a topmost layer of build material is distributed as a first build layer. Accordingly, it will be appreciated that in some examples first and second build layers may be sequential layers in a layer-wise additive manufacturing process. However, it will be noted that first and second do not necessarily describe an overall order of such build layers.

Referring to FIG. 1, the additive manufacturing apparatus 1 may comprise an agent distributor 2 with a fluid reservoir 6, a build material area 42, at least one first electromagnetic radiation emitter 20, at least one second electromagnetic radiation emitter 22a, 22b, and a cooling system 8. In some examples, the cooling system 8 may comprise a heat sink 10. In some examples, the agent distributor 2 may comprise at least one fluid ejection die 4. In some examples, the agent distributor 2 may comprise a number of fluid ejection dies 4, such as, e.g. two rows of two or three fluid ejection dies 4 each.

In some examples, the apparatus 1 may comprise a build material support 41b having a horizontal surface that corresponds to the build material area 42, as illustrated in FIGS. 8a to 8e. As will be appreciated, layers of build material 40 may be distributed in the build material area 42 on the surface of the build material support 41b. In some examples, the build material area 42 may be bound by a boundary wall 41a. In some examples, the boundary wall 41a may form a complete reclosure of the build material area 42, i.e. a circumference of the build material area 42 is formed by the boundary wall 41a.

Furthermore, in some examples, the apparatus 1 comprises may a build material distributor which may be coupled to a scanning carriage. In some examples, the scanning carriage may move bi-directionally along a scanning axis over the build material area 42. As will be appreciated, movement of the scanning carriage may facilitate movement of the build material distributor. The build material distributor may provide build material 40 in the build material area 42 during movement of the scanning carriage over the build material area 42.

In some examples, the build material 40 in the build material area 42 may be pre-heated by a first electromagnetic radiation emitter 20, e.g. a near infrared (NIR) lamp or a short-wave infrared heater that emits a first radiation 21, e.g. a near infrared (NIR) or a short-wave infrared radiation, having, for example, a wavelength of 5-10 µm.

In some examples, an agent distributor 2 may have at least two fluid ejection dies 4 for ejecting a first fluid agent 14a, e.g. a fusing agent, and a second fluid agent 14b, e.g. a detailing agent, from the fluid reservoir 6, respectively. In some examples, the fluid ejection dies 4 may comprise a plurality of nozzles through which the fluid agent 14 may be ejected. In some examples, the fluid ejection dies 4 may substantially consist of silicon.

Figure 8E:
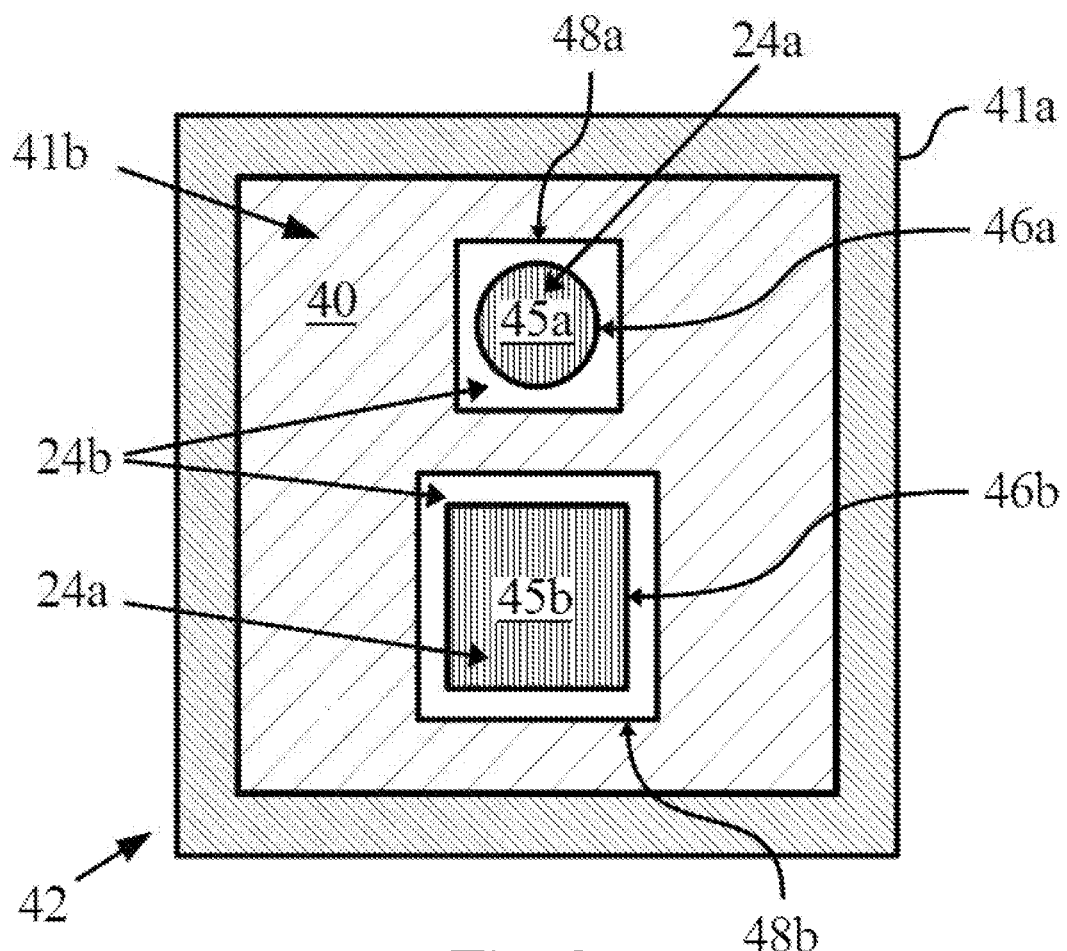
FIG. 8e provides a schematic top view of a build material area, according to an example, during 3D object generation.
Figure 9:
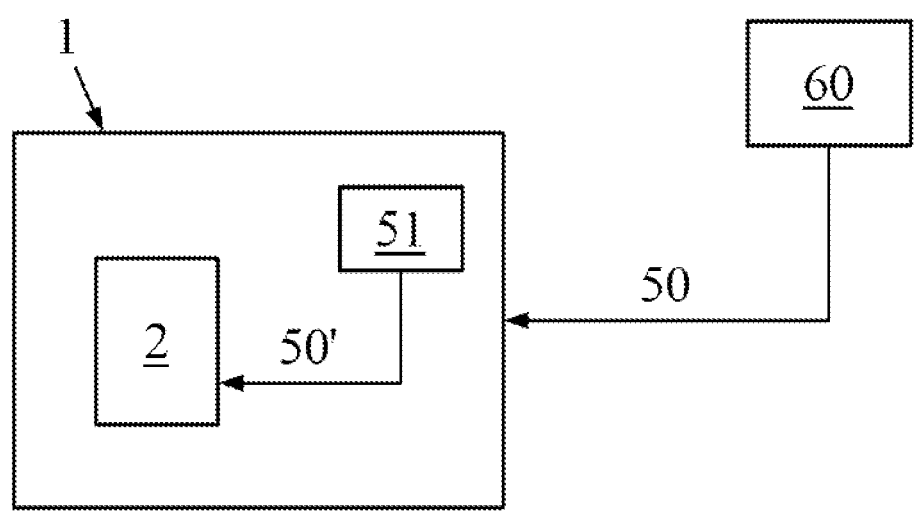
FIG. 9 provides a block diagram of an additive manufacturing apparatus, according to an example, receiving data for generation of a 3D object.

In some examples, the fluid reservoir 6 may be divided into dedicated sections 16 for different fluid agents 14. In some examples, the agent distributor 2 may have at least two rows comprising a plurality of fluid ejection dies 4. In some examples, the at least one fluid agent 14 may be dispensed by the respective fluid ejection die 4. In some examples the dispensed fluid agent 14 may moisten the build material 40 in a given pattern 46, 48, as illustrated in FIG. 8e. The pattern 46, 48 may be defined by received data 50, 50', as illustrated in FIG. 9.

In some examples, the moistened build material 25 is radiated with a second radiation 23. In some examples, the second radiation 23 may be ultraviolet (UV) light emitted by at least one second electromagnetic radiation emitter 22. In some examples, an electromagnetic radiation emitter 22a may be located on one side of the agent distributor 2, and another electromagnetic radiation emitter 22b may be located on another side of the agent distributor 2. In some examples, the electromagnetic radiation emitters 22a, 22b may be UV-lamps. Depending on the dispensed fluid agent 14a, 14b energy emitted by electromagnetic radiation emitters 22a, 22b may be either substantially absorbed within the pattern 46 or substantially reflected within the pattern 48 of the moistened build material 25. By way of the second radiation 23 areas of fused build material 45 may be obtained.

Figure 2:
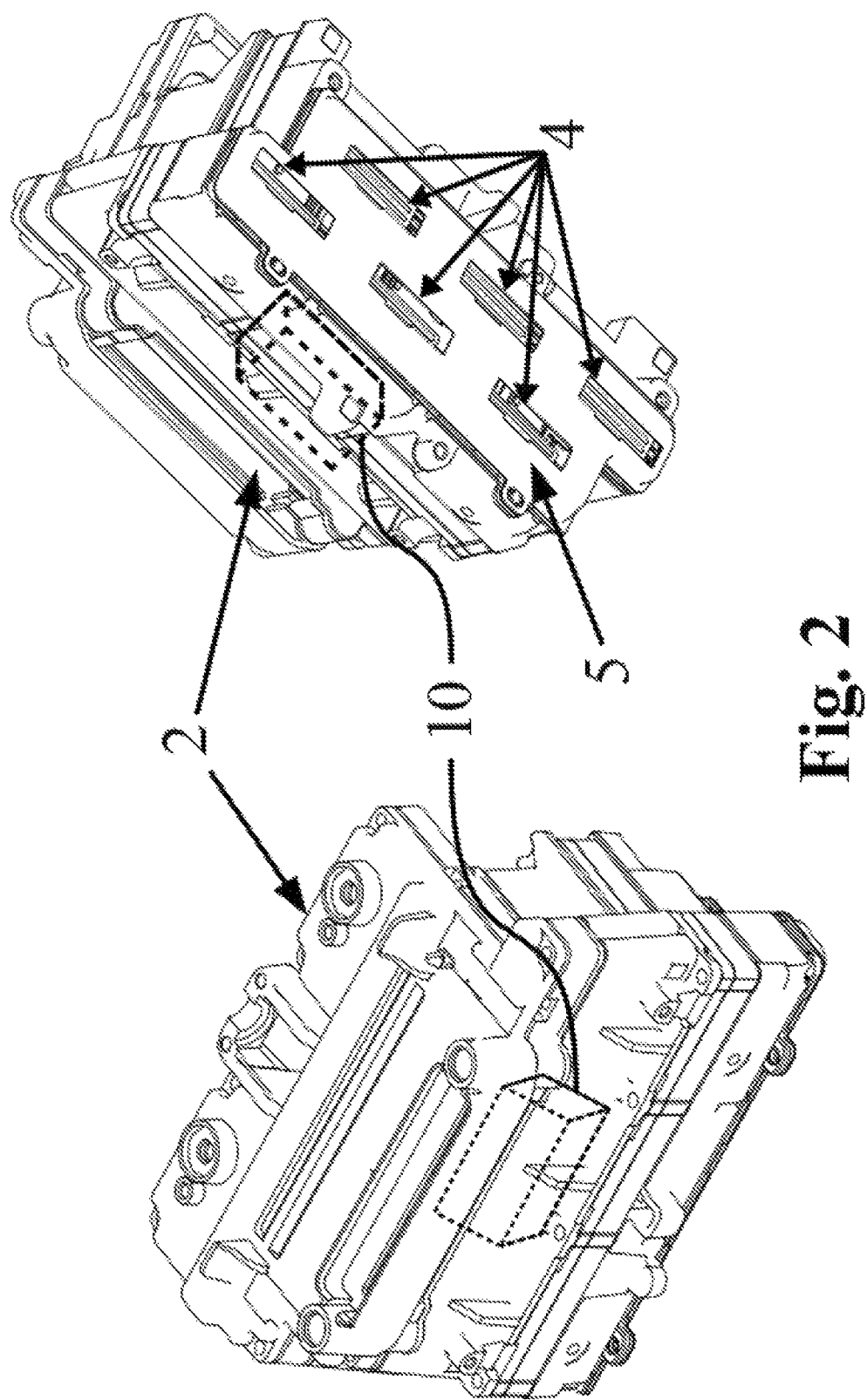
FIG. 2 provides an isometric view of an agent distributor of an additive manufacturing apparatus, according to an example.

FIG. 2 provides a simplified isometric view of an agent distributor 2 for generating a three-dimensional object 11 from build material 40. On the left hand side of FIG. 2 an isometric top-view and on the right hand side an isometric bottom-view of an agent distributor 2, according to an example, is provided. In some examples, the agent distributor 2 may comprise a heat sink 10. In some examples, the agent distributor 2 may comprise six fluid ejection dies 4. In some examples, the agent distributor 2 may comprise fewer or more fluid ejecting dies 4. In some examples, the fluid distributor 2 may comprise a cover layer 5. The cover layer 5 may surround and encompass the fluid ejection dies 4. In some examples, the cover layer 5 may comprise plastic, e.g. polyethylene. In some examples, the cover layer 5 may comprise metal. The agent distributor 2 is illustrated in more detail in FIGS. 3 to 7.

Figure 3:
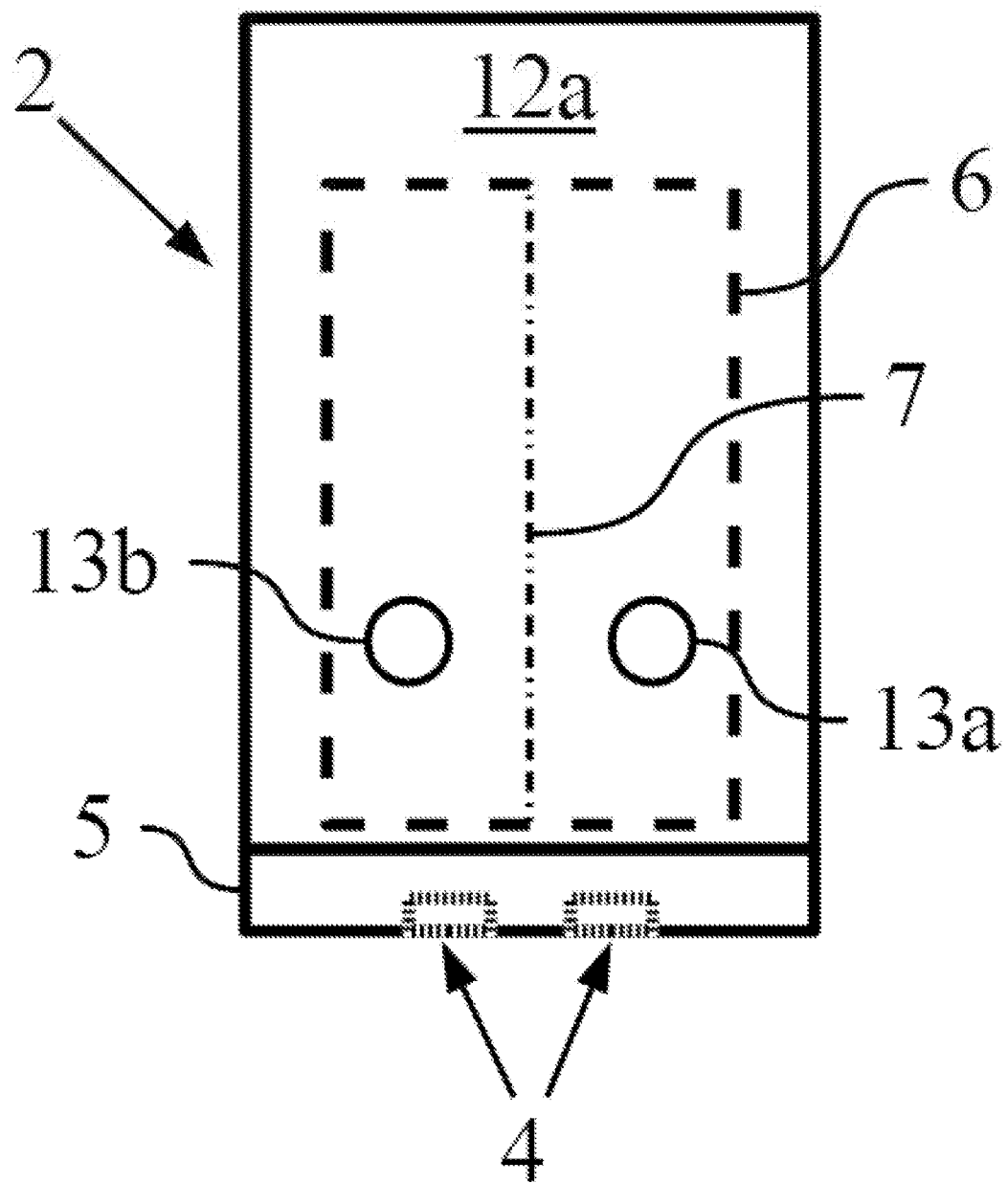
FIG. 3 provides a schematic side view of an agent distributor, according to an example, with a cooling system attached to it.

FIG. 3 provides a schematic side view of an agent distributor 2 comprising two rows of fluid ejection dies 4 and a cover layer 5. The agent distributor 2 may comprise a first agent distributor side panel 12a. In some examples, the first agent distributor side panel 12a may comprise openings 13, e.g. a first opening 13a and a second opening 13b. In some examples a tube 26 may be fed through the first opening 13a and may extend through a fluid reservoir 6 inside the agent distributor 2, which may store fluid agent 14. In some examples, the tube 26 may at least partially comprise a heat conducting material. In some examples, the tube 26 may consist of copper. In some examples, the tube 26 may be hollow. In some examples, the tube 26 may be solid and, for example, connected to an ammonia exchanger. In some examples, the tube 26 may comprise at least one of a passivation and an insulation, at least inside the fluid reservoir 6. In some examples, the tube 26 may also be fed through the second opening 13b, thereby forming a "U-turn", wherein the tube 26 inside the fluid reservoir 6 of the agent distributor 2 may constitute a cooling circuit 18 of heat sink 10. In some examples, the fluid reservoir 6 inside the agent distributor 2 may be divided into two separate sections 16a and 16b by a partition wall 7. The partition wall 7 may have an opening through which the tube 26 extends in both sections 16a, 16b. The two sections 16a and 16b may comprise different fluid agents 14a, 14b. The opening in the partition wall 7 may comprise a seal, which prevents the fluid agents 14a and 14b from mixing.

Figure 4A:
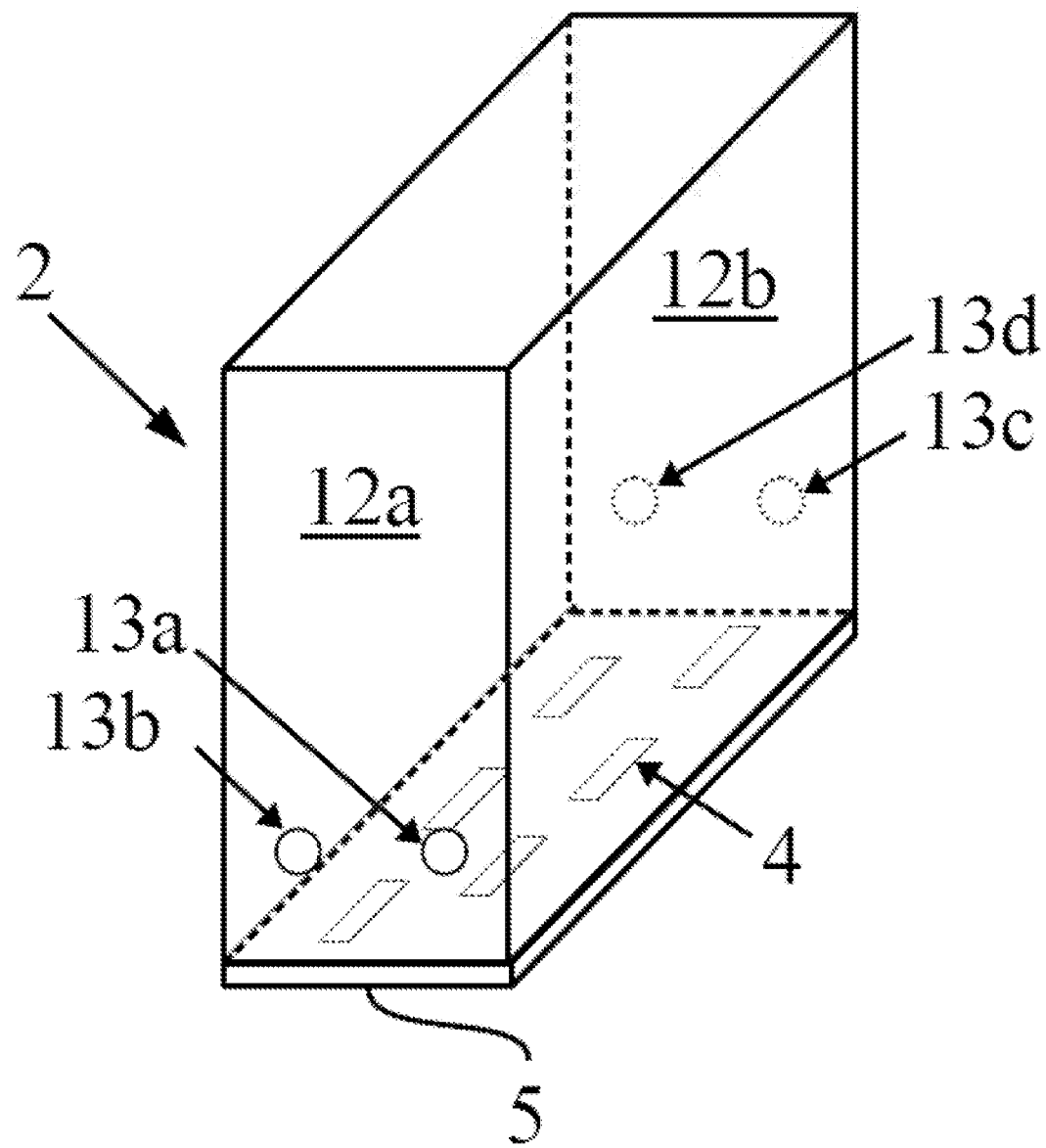
FIGS. 4a and 4b provide an oblique side view of an agent distributor, according to an example, equipped with a cooling circuit of a cooling system.
Figure 4B:
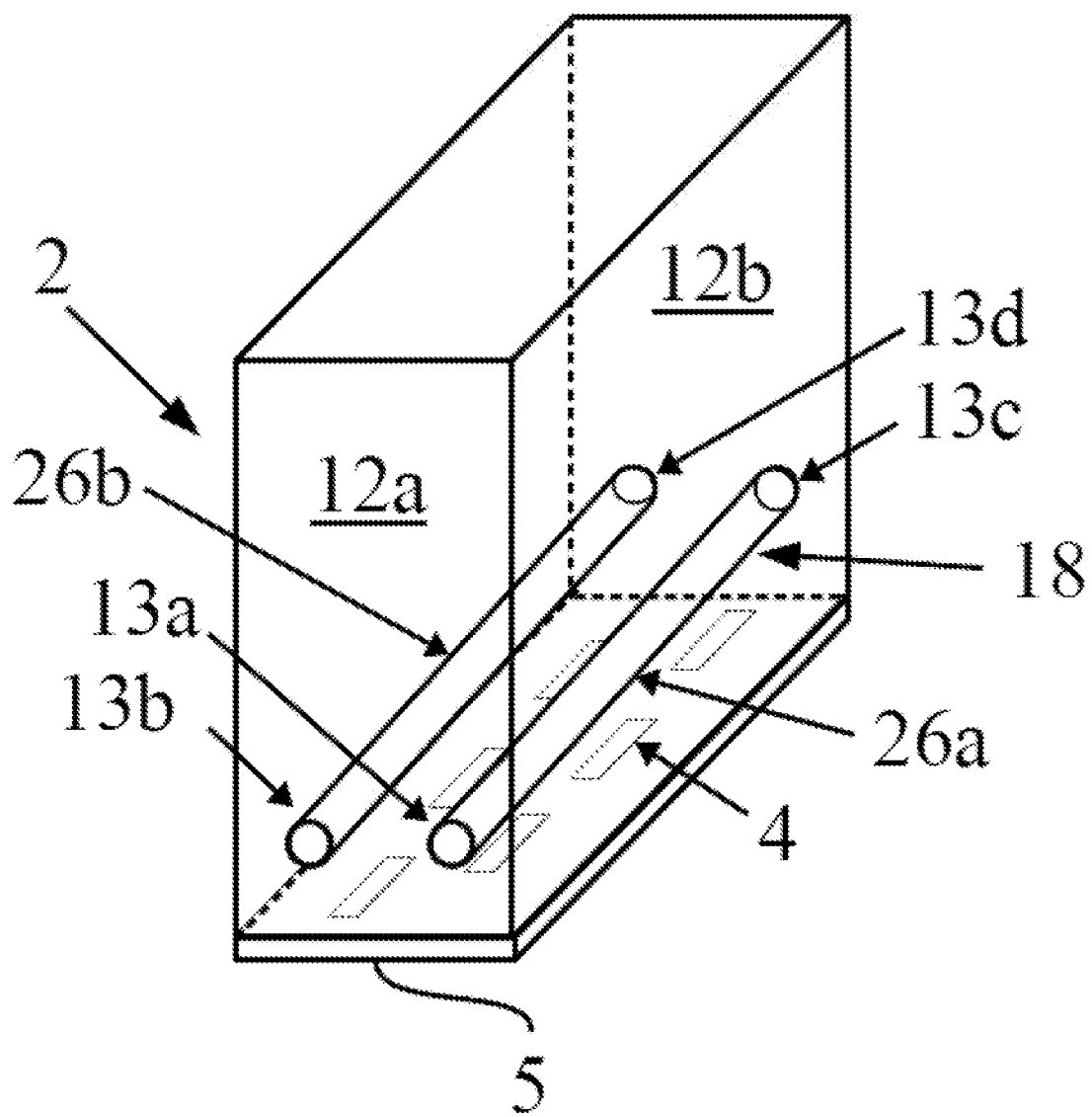

FIGS. 4a and 4b provide a schematic oblique side view of an agent distributor 2 comprising two rows of fluid ejection dies 4 and a cover layer 5. The agent distributor 2 may comprise a first agent distributor side panel 12a and a second agent distributor side panel 12b. In some examples, the first agent distributor side panel 12a may comprise a first opening 13a and a second opening 13b. In some examples, the second agent distributor side panel 12b may comprise a third opening 13c and a fourth opening 13d. In some examples a first tube 26a may be fed through the first opening 13a and may extend through a fluid reservoir 6 inside the agent distributor 2, which may store fluid agent 14. In some examples the first tube 26a may also be fed through the third opening 13c, thereby forming a straight line between the two openings 13a and 13c of the agent distributor 2. The tube 26a inside the fluid reservoir 6 of the agent distributor 2 may be part of a cooling circuit 18 of a heat sink 10. In some examples a second tube 26b may be fed through the second opening 13b and may extend through the fluid reservoir 6 inside the agent distributor 2, which may store fluid agent 14. In some examples the second tube 26b may also be fed through the fourth opening 13d, thereby forming a straight line between the two openings 13b and 13d of the agent distributor 2. The tube 26b inside the fluid reservoir 6 of the agent distributor 2 may be part of the cooling circuit 18 of the heat sink 10. In some examples, the tubes 26a and 26b may at least partially comprise a heat conducting material. In some examples, the tubes 26a, 26b may consist of copper. In some examples, the tubes 26a, 26b may be hollow. In some examples, the tube 26 may be solid and, for example, connected to an ammonia exchanger. In some examples, the tube 26 may comprise at least one of a passivation and an insulation, at least inside the fluid reservoir 6.

Figure 5:
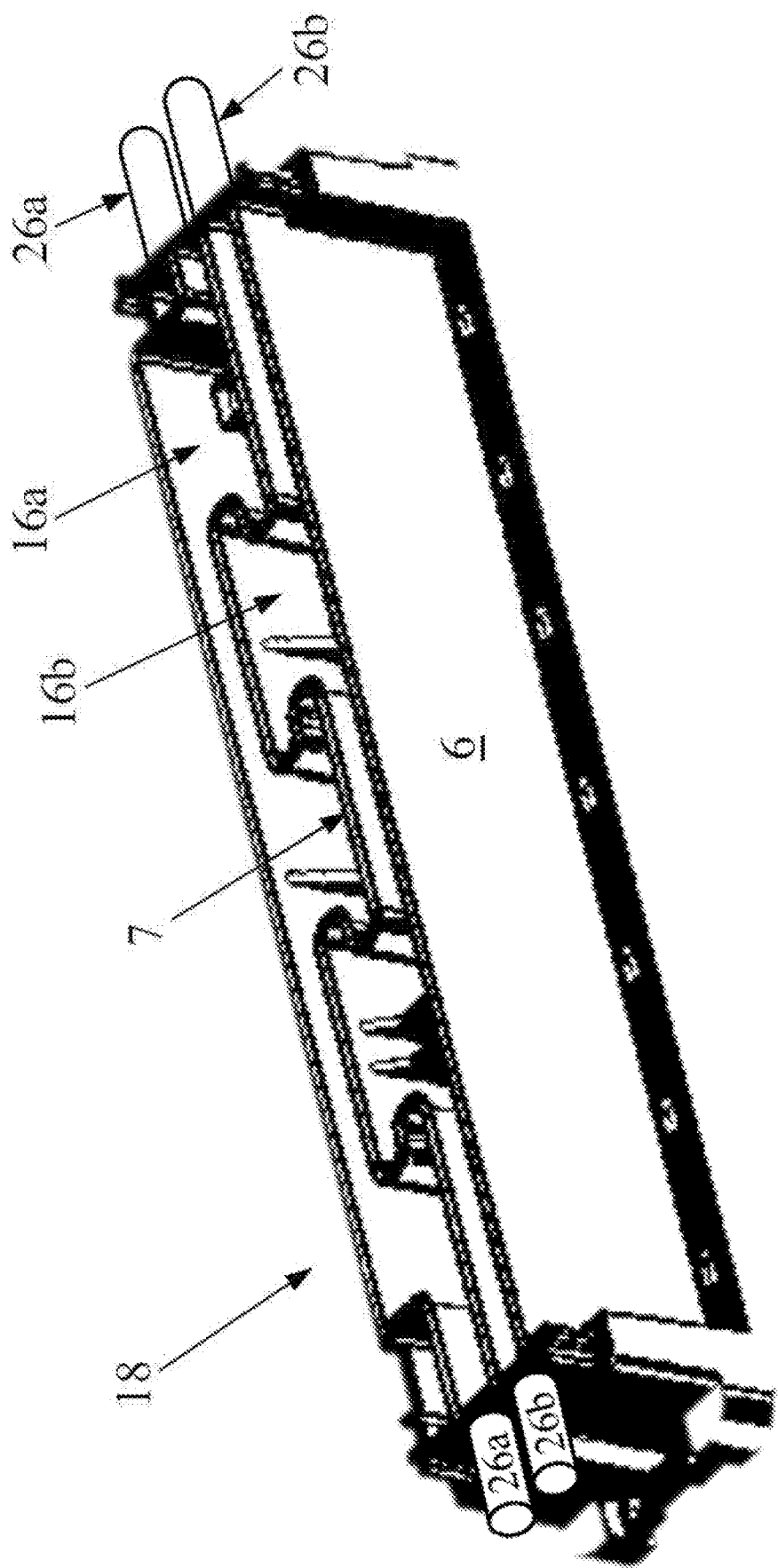
FIG. 5 provides an isometric view of a fluid reservoir of an agent, distributor according to an example equipped with a cooling circuit of a cooling system.

In some examples, the fluid reservoir 6 inside the agent distributor 2 may be divided into two separate sections 16a and 16b by a partition wall 7 as illustrated in more detail in FIG. 5. The openings 13 may comprise a seal, which prevents fluid agent 14 to leak out between the tubes 26 and the agent distributor side panels 12.

FIG. 5 provides an isometric view of a fluid reservoir 6 for storing two fluid agents 14a and 14b separated from each other by a partition wall 7. The fluid reservoir 6 is upside-down, i.e. the fluid ejecting dies would be placed on top of the open side visible in FIG. 5. In some examples, the partition wall 7 may have a meandering shape. In some examples, the partition wall 7 may have a sinusoidal shape. In some examples, the partition wall 7 may have a corrugated shape to increase a surface of the partition wall 7 between the two fluid agents 14a and 14b. The partition wall 7 may divide the fluid reservoir 6 into several sections 16 dedicated to different fluid agents 14; for example, may the partition wall 7 of the fluid reservoir 6 depicted in FIG. 5 divide an interior of the fluid reservoir 6 into two sections 16a and 16b dedicated to a fluid agent 14a and 14b, respectively. In some examples, the separated sections 16a and 16b may be cooled by a respective tube 26a, 26b of the cooling circuit 18 comprising a circulating cooling fluid. In some examples, the circulating cooling fluid may be compressed air, water, or the like. In some examples, the fluid agent 14 stored in the fluid reservoir 6 may be cooled by the tubes 26a, 26b via heat conduction, i.e. heat transport from the fluid agent 14 through a tube wall into the circulating cooling fluid, which may be refrigerated by the cooling system 8.

Figure 6:
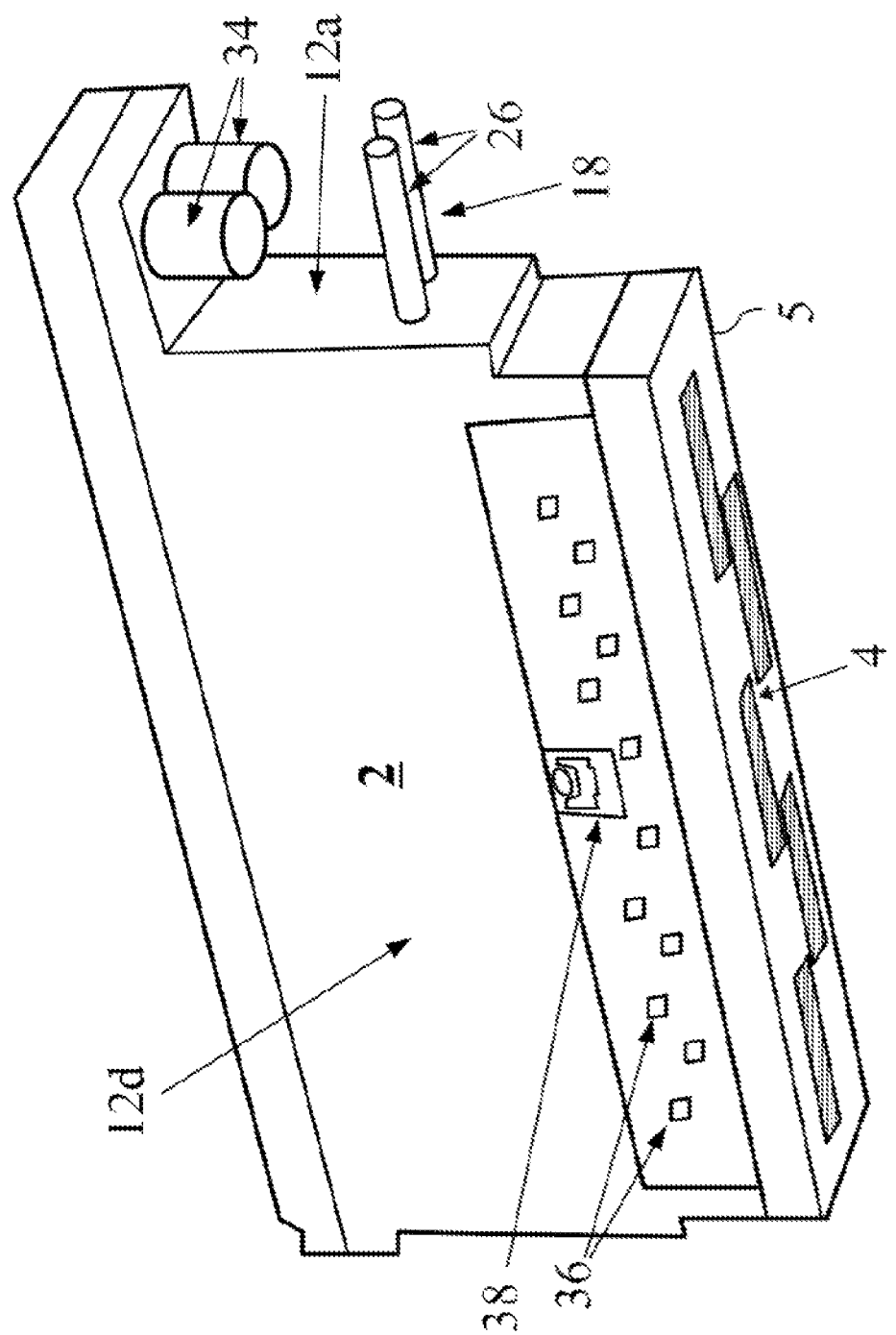
FIG. 6 provides an oblique side view of an agent distributor, according to an example, equipped with a cooling circuit of a cooling system and ports for electrical power and data transmission.

FIG. 6 provides a schematic oblique side view of an agent distributor 2 comprising two rows of fluid ejection dies 4 and a cover layer 5. The cover layer 5 may comprise plastic, e.g. polypropylene (PP), polyvinyl chloride (PVC), acrylonitrile butadiene styrene (ABS), or the like. In some examples, the cover layer 5 may comprise a metal, e.g. copper, iron, aluminum, or the like. In some examples, the cover layer 5 may comprise ceramic, e.g. kaolin, silicon carbide, or the like. In some examples, the agent distributor may comprise a cooling circuit 18 comprising a tube 26. In some examples, the tube 26 may run through an opening 13a in a first agent distributor side panel 12a and through an opening 13b in the first agent distributor side panel 12a. In some examples, the tube 26 may extend into the fluid reservoir 6 as described in conjunction with FIG. 3.

In some examples, the agent distributor 2 may comprise fluid agent supply ports 34 for respective fluid agents 14. In some examples, the fluid reservoir 6 may be divided by a partition wall 7 according to FIG. 5. In some examples, the dedicated sections 16 may be supplied with fluid agent 14 via the fluid agent supply ports 34. More precisely, a first section 16a may be supplied with a first fluid agent 14a and a second section 16b may be supplied with a second fluid agent 14b. In some examples, the tube 26 of the cooling circuit 18 of cooling system 8, which might comprise circulating cooling fluid, may exhibit a "U-Turn" shape, i.e. the tube 26 may extend into the first section 16a, pass through the partition wall 7, which might be equipped with a seal at a penetration point of the tube 26, and extend into the second section 16b. Hence, in these examples both separated sections 16a and 16b may be cooled by the same tube 26.

In some examples, the agent distributor 2 may comprise a fourth agent distributor side panel 12d. In some examples, the fourth agent distributor side panel 12d may comprise a plurality of electrical connectors 36 which connect the agent distributor 2 to electric lines of the apparatus 1. In some examples, the agent distributor 2 may receive electrical power via the electrical connectors 36 from the apparatus 1. In some examples, the fourth agent distributor side panel 12d of agent distributor 2 may comprise a data transmission port 38. In some examples, the agent distributor 2 may receive data 50' comprising patterns 46, 48 related to fluid agent distribution onto build material 40 for generating a three-dimensional object 44. In some examples, the data 50 may be sent to the agent distributor 2 by a central processing unit 51, such as, e.g. as processor, as is illustrated in more detail in FIG. 9.

Figure 7A:
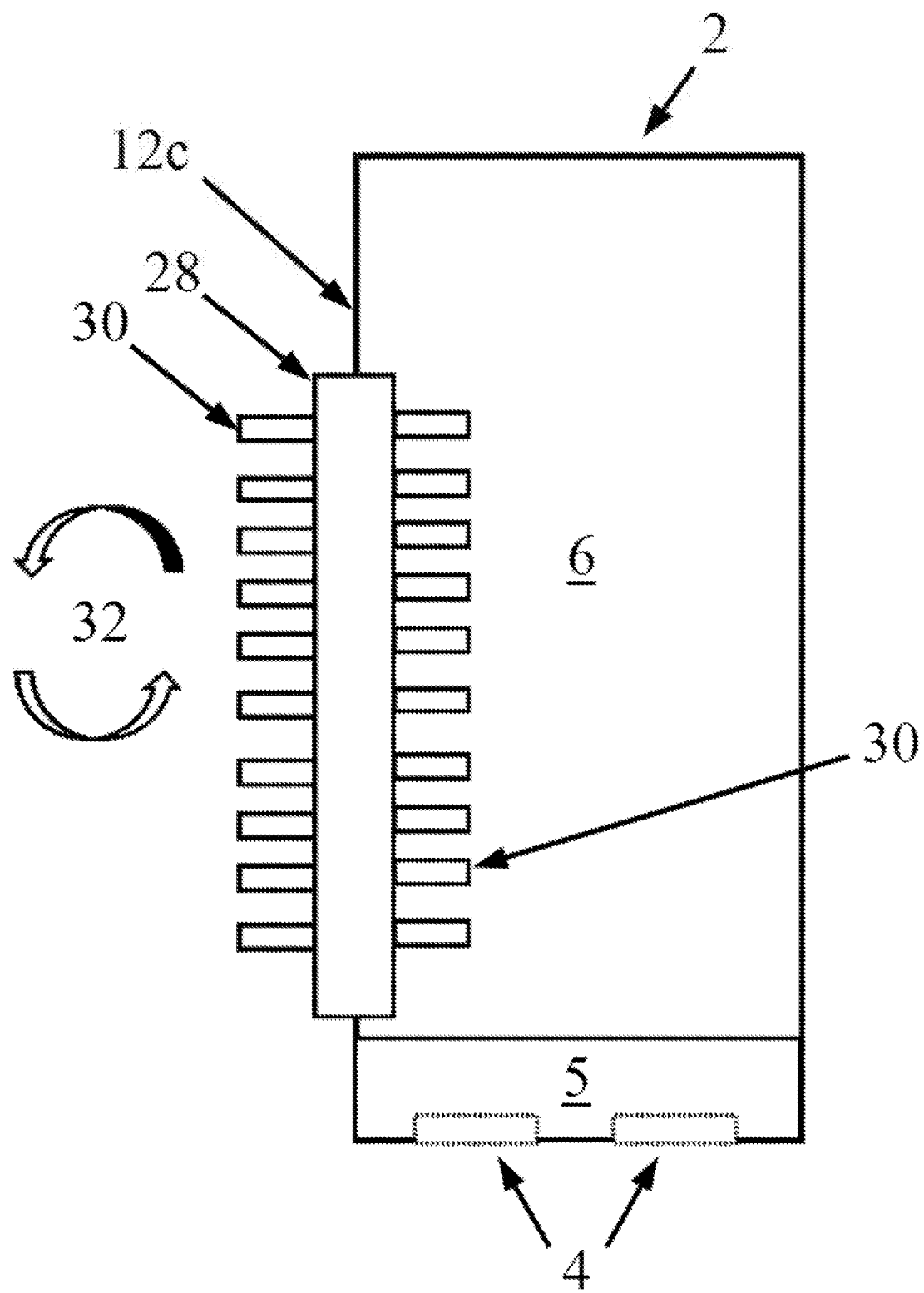
FIGS. 7a and 7b provide a schematic side view of an agent distributor, according to an example, equipped with a heat conducting plate of a cooling system.
Figure 7B:
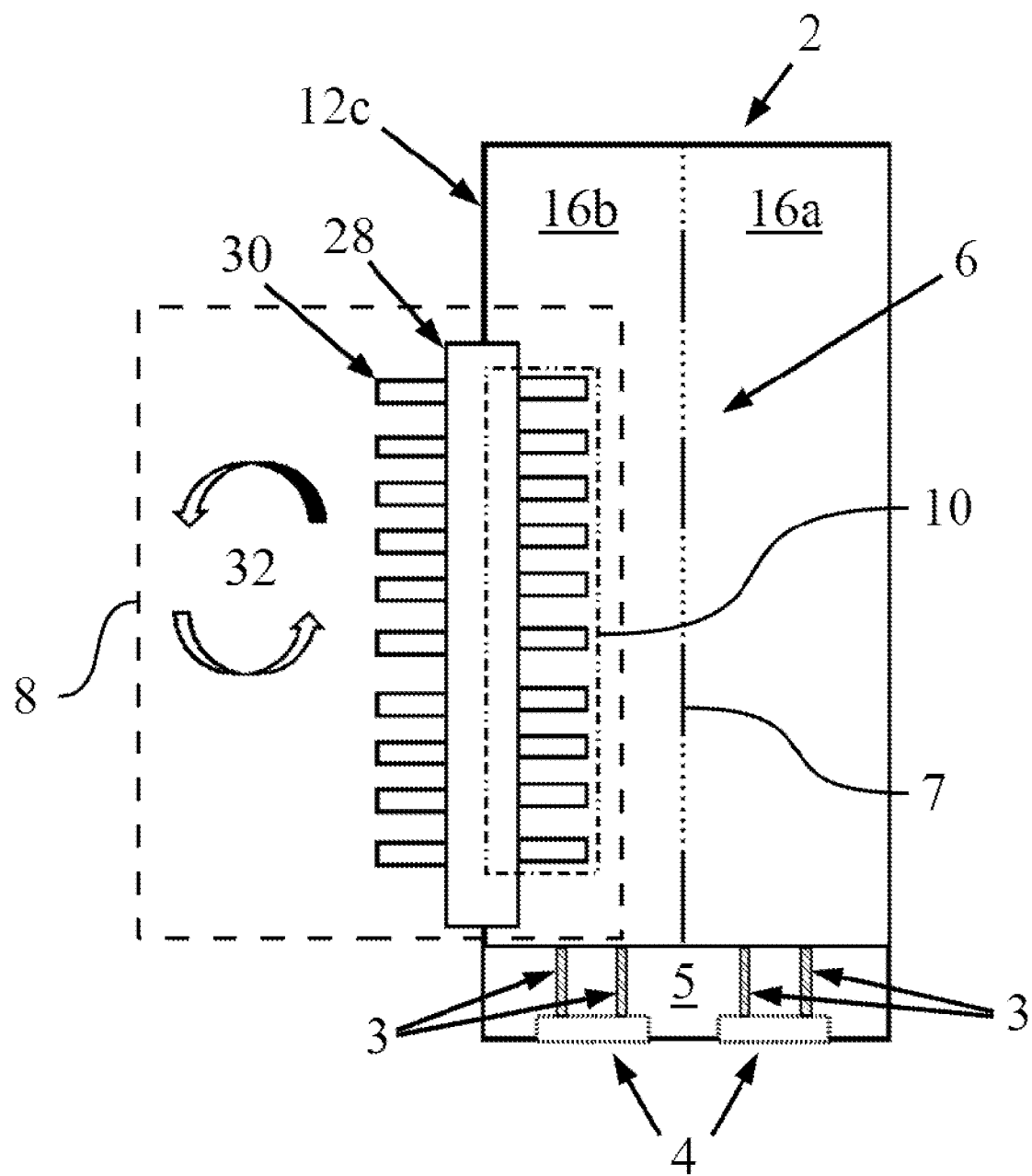

FIGS. 7a and 7b provide a schematic side view of an agent distributor 2 comprising a fluid reservoir 6, two rows of fluid ejection dies 4, and a cover layer 5. In some examples, the fluid ejection dies 4 may be connected to the fluid reservoir 6 via fluid channels 3. In some examples, the agent distributor 2 may comprise a third agent distributor side panel 12c. In some examples, a heat conducting plate 28 may be embedded in the third agent distributor side panel 12c. In some examples, the heat conducting plate 28 may substantially take the place of the third agent distributor side panel 12c, i.e. the third agent distributor side panel 12c may have a large opening, which substantially covers the entire area of the third agent distributor side panel 12c, in which the heat conducting plate 28 is inserted. In some examples, the heat conducting plate 28 protrudes both sides of the third agent distributor side panel 12c, i.e. the heat conducting plate 28 is exposed both on an interior of the fluid reservoir 6 and an exterior of the fluid reservoir 6.

In some examples, the heat conducting plate 28 may comprise heat conducting fins 30 to increase the surface of the heat conducting plate 28. In some examples, the heat conducting plate 28 may consist of metal, a metal alloy, a combination thereof, or the like. In some examples, the heat conducting fins 30 may consist of metal, a metal alloy, a combination thereof, or the like. In some examples, the plate 28 and fins 30 may be made of copper.

In some examples, the fluid reservoir 6 inside the agent distributor 2 may be divided into two separate sections 16a and 16b by a partition wall 7 as illustrated in more detail in FIG. 5. In some examples, the partition wall 7 may have a meandering shape. In some examples, the partition wall 7 may have a sinusoidal shape. In some examples, the partition wall 7 may have a corrugated shape to increase a surface of the partition wall 7 between the two fluid agents 14a and 14b. In some examples, fluid agent 14b in the section 16b may be cooled by the heat sink 10 of the cooling system 8. In some examples, fluid agent 14a in the section 16a may be cooled indirectly by the heat sink 10 of the cooling system 8 via the fluid agent 14b and the partition wall 7.

In some examples, a part of the heat conducting plate 28, which is located on the interior of the fluid reservoir 6, may be considered as heat sink 10. In some examples, a part of the heat conducting plate 28, which is located on the exterior of the fluid reservoir 6, may be considered as heat source.

In some examples, the exterior of the heat conducting plate 28, i.e. the heat-source part of the heat conducting, plate 28, may be cooled by a coolant circuit 32. In some examples, the heat conducting plate 28 may be cooled by ambient air. In some examples, the coolant circuit 32 may comprise a circulating coolant. In some examples, the coolant of coolant circuit 32 may be refrigerated. In some examples the coolant maybe a liquid, e.g. a refrigerated coolant like deionized water or water with additives such as ethylene glycol, diethylene glycol, or propylene glycol. In some examples, the coolant may be a gas, e.g. high pressured air, hydrogen, or sulfur hexafluoride. In some examples, the coolant may be cooled by a Peltier element, a heat exchanger, or the like. In some examples, the coolant may be in an open loop flow, i.e. a continuous supply of fresh coolant, e.g. water from a faucet, may be provided to cool the heat conducting plate 28 of the agent distributor 2 and the fluid ejection dies 4 therein. In some examples, the coolant of the coolant circuit 32 may be the cooling fluid of the cooling circuit 18 described in conjunction with FIGS. 4, 5, and 6.

A process of forming layers of a three-dimensional (3D) object 44, according to an example, using an additive manufacturing apparatus 1 is shown in FIGS. 8a to 8d. FIG. 8e provides a top view of the build material area 42 during the process of fusing build material 40. The additive manufacturing apparatus 1, according to an example, may comprise a build material distributor, which may be coupled to a scanning carriage, a build material area 42, an agent distributor 2 with at least one fluid ejection die 4 and a plurality of electromagnetic radiation emitters 20, 22. (cf. FIG. 1).

Figure 8A:
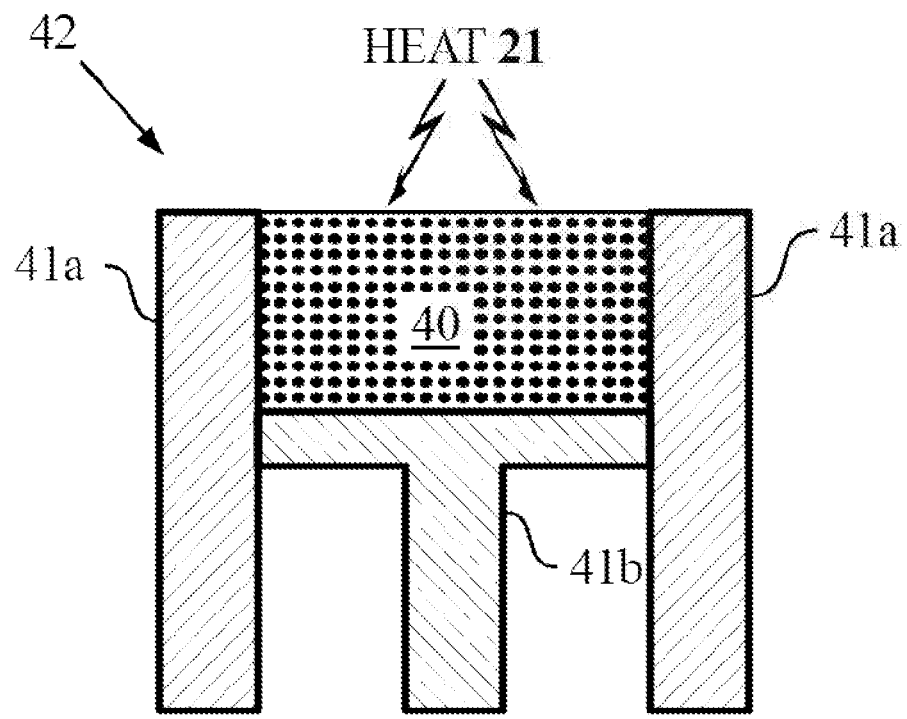
FIGS. 8a to 8d provide a schematic side view of a build material area, according to an example, during 3D object generation.

In the example shown in FIG. 8a, a first layer of build material 40 has been deposited in the build material area 42. In some examples, the build material area 42 may be defined by a boundary wall 41a and a build material support 41b, on which the build material 40 may be situated. The build material 40 may be a powder, a paste, a gel or a composition thereof. For example, the build material 40 maybe a polymeric powder composition.

The physical elements, in particular the build material distributor, agent distributor 2, emitters 20, 22, and build material support 41b, may be operatively connected to a central processing unit (CPU) 51, such as, e.g., a processor (see FIG. 9), of the additive manufacturing apparatus 1.

In some examples, after the first layer of the build material 40 has been deposited in the build material area 42, the layer of build material 40 may be pre-heating (as shown in FIG. 8a), for example at a heating temperature that is below the melting point of the build material 40.

Preheating the layers of the build material 40 may be accomplished using any suitable heat source that exposes all of the build material 40 in the build material area 42 to heat 21. In some examples the heat source may include a thermal heat source or a light radiation source, such as a first an electromagnetic radiation emitter 20 emitting first radiation 21.

In some examples, after pre-heating the layer of build material 10, a fusing agent 14a may be selectively applied on at least one solidification portion 24a of the layer. In some examples, a solidification portion 24a of the layer may be a portion in which the build material 40 is to be solidified, e.g. by fusing, to form a layer of fused build material 45, which is part of a 3D object 44. For example, a solidification portion 24a may correspond to a cross section of a 3D object 44 to be printed for the current layer. When the term fused is used herein, it may mean curing, sintering, fusing, binding or the like.

In some examples, one 3D object 44 is to be printed and a fusing agent 14a may be selectively applied on one solidification portion 24a corresponding to the cross section of the 3D object 44. In some examples, a plurality of objects 44 is to be printed and a fusing agent 14a may be selectively applied on a plurality of solidification portions 24a corresponding to cross sections of the plurality of 3D objects 44.

As an example, if the 3D object 44 is to be shaped like a cube or cylinder, the fusing agent 14a may be deposited in a square pattern 46b or circular pattern 46a (from a top view), respectively, on at least a solidification portion 24a of the layer of the build material 40 in the build material area 42, as shown in FIG. 8e.

In the example shown in FIG. 8e, two different objects 44 are to be printed. Here, one object 44a is shaped like a circular cylinder, whereas the other object 44b is shaped like a rectangular prism. FIG. 8e schematically shows a top view of the layer of the build material 40 in the build material area 42. The solidification portions 24a of the two objects 44 to be printed have a circular and a rectangular shape, respectively.

Figure 8B:
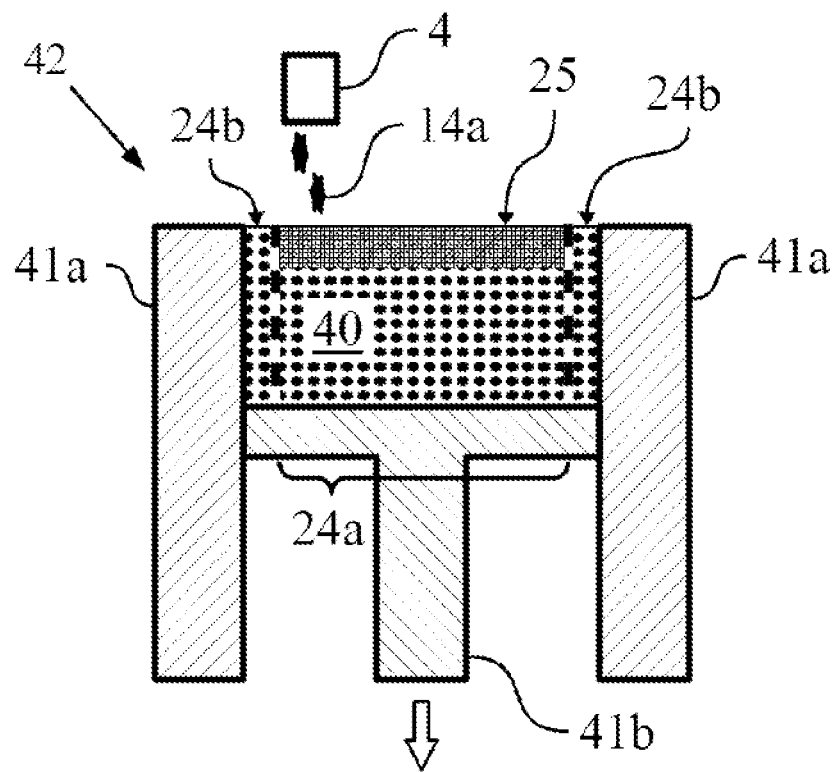

As illustrated in FIG. 8b, the fusing agent 14a may be dispensed from a fluid ejection die 4 of the agent distributor 2, such as, e.g. a print head. While a single fluid ejection die 4 is shown in FIG. 8b, it is to be understood that multiple fluid ejection dies 4 (which may or may not be part of the same agent distributor 2) may be used.

In some examples, the process of forming layers of a three-dimensional (3D) object 44 further includes to selectively apply a detailing agent 14b on a detailing portion 24b of the layer of the build material 40. Here, a detailing portion 24b is a portion of a layer of build material 40 in the build material area 42 in which the build material 40 should not fuse or coalesce.

In some examples, a detailing agent 14b may be a fluid agent 14 which serves to reduce or prevent fusing the build material 40 in the detailing portion 24b. The detailing agent 24b may act as a coolant which effectively removes energy and keeps the build material 40 at a temperature that prevents fusing of the build material 40.

In some examples, the detailing agent 14b may be dispensed from a fluid ejection die 4 of an agent distributor 2, similar to the application of the fusing agent 14a explained above, in frame-like patterns 48a, 48b or edge zones around or along the contours of the solidification portions 24a, i.e. the cross sections of the 3D objects 44 that are to be formed for the layer (as is shown in FIG. 8e). In some examples, this may enhance edge details of the object(s) 44 to be printed. In the example of FIG. 8e, detailing portions 24b are situated around or along the contours of the solidification portions 24a.

In some examples, the detailing agent 14b is dispensed from the same agent distributor 2 as the fusing agent 14a. In some other examples, a different agent distributor 2' or multiple different agent distributors are provided from which the detailing agent 14b may be dispensed. In some examples, the detailing agent 14b may applied prior to or concurrently with the fusing agent 14a.

In some examples, the central processing unit 51 of the apparatus 1, e.g. the processor, may receive print data 50.

Figure 8C:
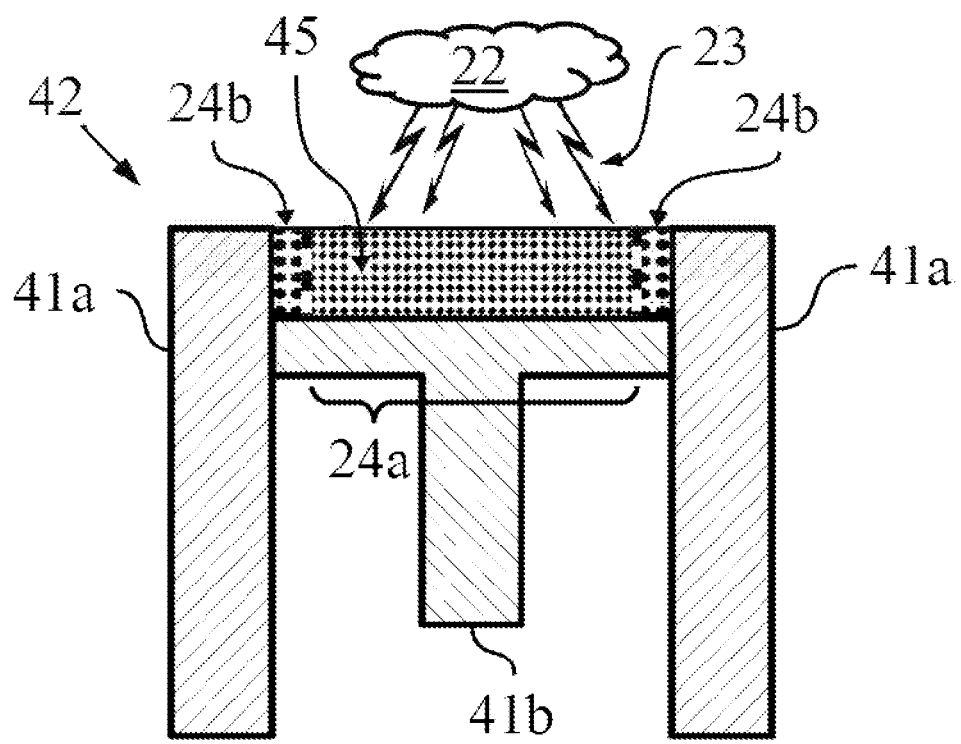

As indicated in FIG. 8c, after the fusing agent 14a is applied to the solidification portions 24a and, in some examples, the detailing agent 14b is applied to the detailing portions 24b, respectively, the entire layer of the build material 40 in the build material area 42 or at least a portion thereof is exposed to second radiation 23, such as, e.g. ultraviolet (UV) or near ultraviolet (near UV) radiation.

In some examples, the second radiation 23 may be emitted from a second electromagnetic radiation emitter 22, such as an IR or near IR fusing lamp, IR or near IR light emitting diodes (LED), lasers with IR wavelengths. In some examples, the radiation 23 emitted by the electromagnetic radiation emitter 22 may have a shorter wavelength than IR or near IR light. For example, the radiation 23 emitted from electromagnetic radiation emitter 22 may be visible light, or UV or near UV light. In some examples, the second electromagnetic radiation emitter 22 may include a UV or near UV light source.

The electromagnetic radiation emitter 22 may be controlled to receive commands from the central processing unit 51, e.g. the processor, and to expose the layer and, in some examples, the fusing agent 14a to the radiation 23. In some examples, the build material 40 in irradiated areas of the build material 40 in the build material area 42, e.g. the solidification portions 24a, may form fused build material 45, i.e. a layer of the object 44 to be formed.

The electromagnetic radiation emitter 22 used will depend, at least in part, on the type of build material 40 and, in some examples, on the type of fusing agent 14a that is used. The length of time the radiation 23 is applied for, or energy exposure time, may be dependent, for example, on a number of characteristics of the electromagnetic radiation emitter 22, characteristics of the build material 40, and/or characteristics of the fusing agent 14a.

In some examples, the exposure to the radiation 23 may result in fusing of the build material 40 in the build material area 42 within the solidification portions 24a, thereby hardening the appropriate layer of the three-dimensional object 44 to be printed (=fused build material 45). In some examples, the fusing agent 14a enhances the absorption of the radiation 23, converts the absorbed radiation 23 to thermal energy, and promotes the transfer of the thermal energy to the build material 40 in proximity thereof (i.e., the build material 40 within thermal contact of the fusing agent 14a). In an example, the fusing agent 14a sufficiently elevates the temperature of the build material 40 in the solidification portion 24a above the melting point, allowing fusing of the particles of the build material 40, e.g. the polymeric powder composition, to take place.

In some examples, the radiation 23 emitted by the electromagnetic radiation emitter 22 itself may sufficiently elevate the temperature of the build material 40 in the solidification portions 24a above the melting point, thereby allowing fusing of the build material 40 in build material area 42 to take place. Thus, exposure to radiation 23 forms one layer of fused build material 45 and thus one layer of the three-dimensional object 44 to be formed. In some examples, the build material 40 in the at least one detailing portion 24b in the layer, that has the detailing agent 14b applied thereto, does not absorb sufficient energy from the radiation 23 to elevate the temperature of the build material 40 above the melting point.

Thereby, in some examples the detailing agent 14b may at least partially prevent fusing of the build material 40 in the build material area 42 within the at least one detailing portion 24b.

Figure 8D:
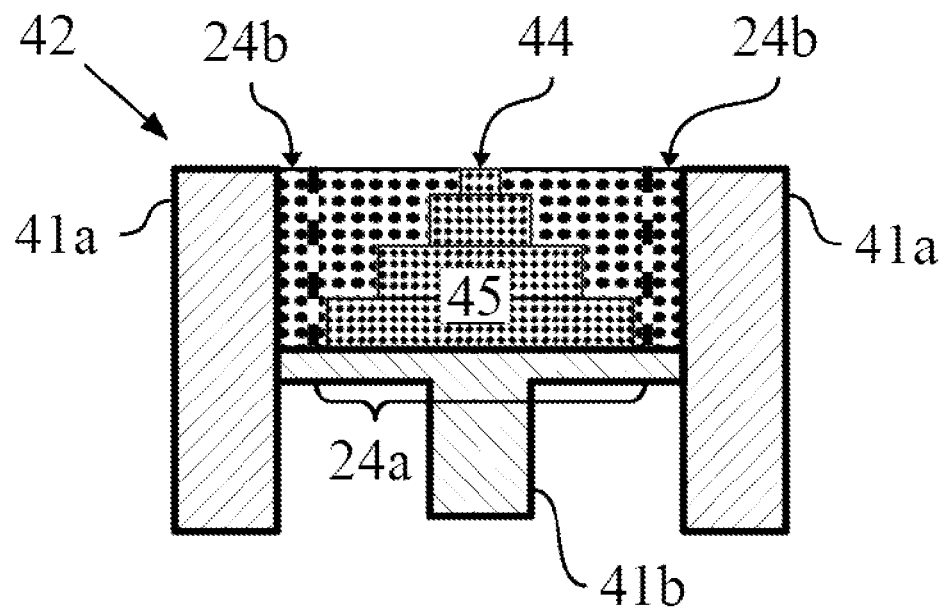

FIG. 8d illustrates one example of a three-dimensional object 44 in the build material area 42. It is to be understood, however, that the subsequently formed layers may have any shape and/or thickness and may be the same as or different from any other layer depending upon the size, shape, etc. of the 3D object 44 that is to be formed.

When the 3D object 44 is complete, it may be removed from the build material area 42, and the unfused build material 40 and detailing agent 24b may be separated from one another.

FIG. 9 provides a block diagram of an additive manufacturing apparatus 1, according to an example. In some examples, a user 60 may transmit data 50, e.g. print data, which may include a 3D representation of an object 44 to be printed, to the apparatus 1. The transfer of data 50 may take place, for example, via a TCP/UDP connection between a client of the user 60 and the additive manufacturing apparatus 1. In some examples, the additive manufacturing apparatus 1, may comprise an Ethernet card or a wireless transceiver to communicate in a local network. In some examples, the additive manufacturing apparatus 1 may further comprise a central processing unit (CPU) 51, such as, e.g., a processor, microprocessor, integrated circuit (IC), or the like.

The central processing unit 51 (e.g. running computer-readable instructions stored on a non-transitory, tangible computer-readable storage medium) may manipulate and transform data represented as physical (electronic) quantities within the printer's registers and memories in order to control the physical elements to create the 3D objects 44. The data for the selective delivery of the build material 40, and a number of printing agents 14 may be derived from a model of the 3D objects 44 to be formed.

In some examples, the 3D model data is parsed to evaluate the objects 44 to be printed in the 3D model data. In some examples, at least one pattern 46, 48 that corresponds to a cross section of the object(s) to be printed in the 3D model data is generated for at least one layer. In some examples, the cross section(s) are generated for a number of layers or for each layer. The cross section(s) correspond to solidification portions 24a for the layer(s).

In some examples, the processor 51 may modify the print data 50 to include the patterns 46, 48 of the objects 44 to be printed. In some examples, the modified print data 5' is sent to the at least one agent distributor 2 of the apparatus 1. In some examples, the modified print data 50' may cause the agent distributor 2 to apply a fusing agent 14a to the solidification portions 24a via the fluid ejection dies 4.

In some examples, at least one agent distributor 2 may be controlled to receive commands from the processor 51 and to deposit the fusing agent 14a according to a pattern 46 of a cross section for a layer of the 3D object 44 that is to be formed. As used herein, the cross section of the layer of the object to be formed refers to the cross section that is parallel to the build material support 41b.

In some examples, the agent distributor 2 may be controlled to receive the modified print data 50' including the detailing portions 24b, such that the modified print data 50' causes the agent distributor 2 to deposit the detailing agent 14b to generate the detailing portions 24b.

In some examples, the CPU 51 may process and thereby edit the received data 50 at least partially, e.g., by at least one adding solidification portion 24a, which corresponds to a cross section of the 3D representation of the object 44 to be printed, and a detailing portion 24b to the received print data 50. In some examples, the CPU 51 may render the cross section of an object 44 to be printed thereby defining a pattern 46 in which fusing agent 14a is to be applied onto the layer of build material 40 in the build material area 42. In some examples, the CPU 51 may provide position data to the agent distributor 2 defining areas of build material 40 in the build material area 42, which are to be moistened with fluid agent 14, e.g. a solidification portion 24a that has fusing agent 14a applied thereto. In some examples, the CPU 51 may transmit the modified print data 50' to the agent distributor 2 via a data transmission port 38 using a data transmission line, e.g. a copper cable connecting the data transmission port 38 of the agent distributor 2 to an output of the central processor 51 of the additive manufacturing apparatus 1.

In some examples, a scanning carriage, to which the agent distributor 2 may be coupled, may move bi-directionally along a scanning axis over the build material area 42 according to the transmitted data 50'. In some examples, the electrical power necessary for the actions to be performed by the agent distributor 2, e.g. dispensing fluid agent 14 from a fluid ejection die 4, may be provided to the agent distributor 2 via electrical connectors 36, as illustrated in FIG. 6.

Figure 10:
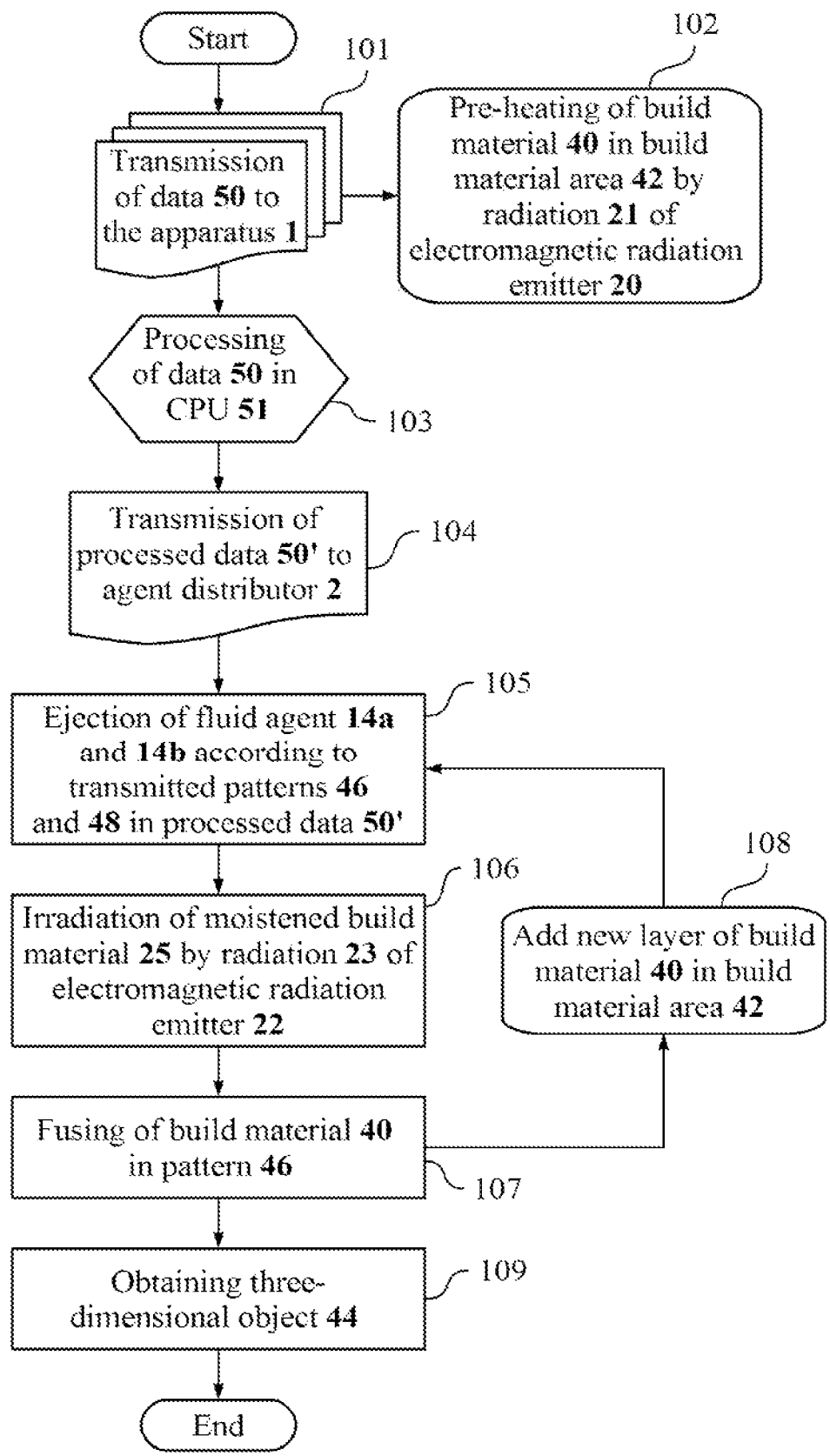
FIG. 10 provides a flow chart of an additive manufacturing process, according to an example.

FIG. 10 provides a flowchart of an additive manufacturing process for a three-dimensional (3D) object 44. At reference numeral 101 print data 50, which may comprise specifications of the object 44 to be printed, may be transmitted from a user 60 (or a client used by a user 60) to an additive manufacturing apparatus 1 via a network connection, e.g. a wireless TCP connection, a Bluetooth connection, or the like.

In response to receiving the print data 50 from the user 60 build material 40 in a build material area 42 of the additive manufacturing apparatus 1 may be pre-heated in preparation of an additive manufacturing process of objects 44, as shown at numeral 102. In some examples, energy required for pre-heating the build material 40 in the build material area 42 may be provided by an electromagnetic radiation emitter 20, e.g., an infrared (IR) or near IR lamp, IR or near IR light emitting diodes (LED), lasers with IR wavelengths, or the like. The electromagnetic radiation emitter 20 may irradiate the build material 40 in the build material area 42 with radiation 21 with a wavelength corresponding to the used emitter 20, e.g. radiation 21 with a wavelength of 5-10 μm from a near infrared (NIR) lamp.

At reference numeral 103 the received data 50 may be processed by a central processing unit (CPU) 51. In some examples, the data 50 may be modified by defining solidification portions 24a and detailing portions 24b which fusing agent 14a and detailing agent 14b is to be distributed on, respectively. These portions 24a, 24b may be added as patterns 46, 48 fore dispersion of fluid agent 14 to the received print data 50, thereby generating modified print data 50'.

At reference numeral 104 the modified data 50' may be transmitted to an agent distributor 2 via a data link between an output of the CPU 51 and a data transmission port 38 of the agent distributor 2. In some examples, the data transmission port 38 may be located on a fourth agent distributor side panel 12d. In some examples, the data transmission port 38 may be located next to at least one electrical connector 36, as illustrated in FIG. 6.

At reference numeral 105 the agent distributor 2 may selectively distribute the fluid agents 14a and 14b corresponding to the solidification portions 24a and detailing portions 24b according to the patterns 46 and 48 contained in the modified print data 50' on the build material 40 in the build material area 42. In some examples, solidification portions 24a and detailing portions 24b may be moistened by respective fluid agents 14a, 14b.

At reference numeral 106 portions of moistened build material 25 may be irradiated by second radiation 23 from at least one second electromagnetic radiation emitter 22. In some examples, the irradiation of the build material area 42, i.e. the input of energy into the build material 40, may cause the moistened build material 25 within at least one solidification portion 24a to fuse, thereby generating, at reference numeral 107, fused build material 45. Hence, the fused build material 45, which may be confined to solidification portions 24a, may constitute a layer in the 3D object 44 to be printed.

After fusing the build material 40 in the solidification portion 24a, a new layer of build material 40 may be placed on top of the fused build material 45 in the build material area 42, as indicated at reference numeral 108. In some examples, fluid agent 14a and 14b may be selectively distributed on this new layer according to the pattern 46, 48 corresponding to the shape of the object 44 to be printed, which may be contained in the modified print data 50'. In some examples, the object 44 to be printed my be generated by repeating the activities described in conjunction with reference numerals 105, 106, 107, and 108.

After repeating the above described activities for a number of times corresponding to the shape of the object 44 to be printed, i.e. after a number of layers required to form the 3D object 44 have been generated and fused by the second radiation 23 of the second electromagnetic radiation emitter 22, the generated 3D object 11 may be obtained at reference numeral 109.

Figure 11:
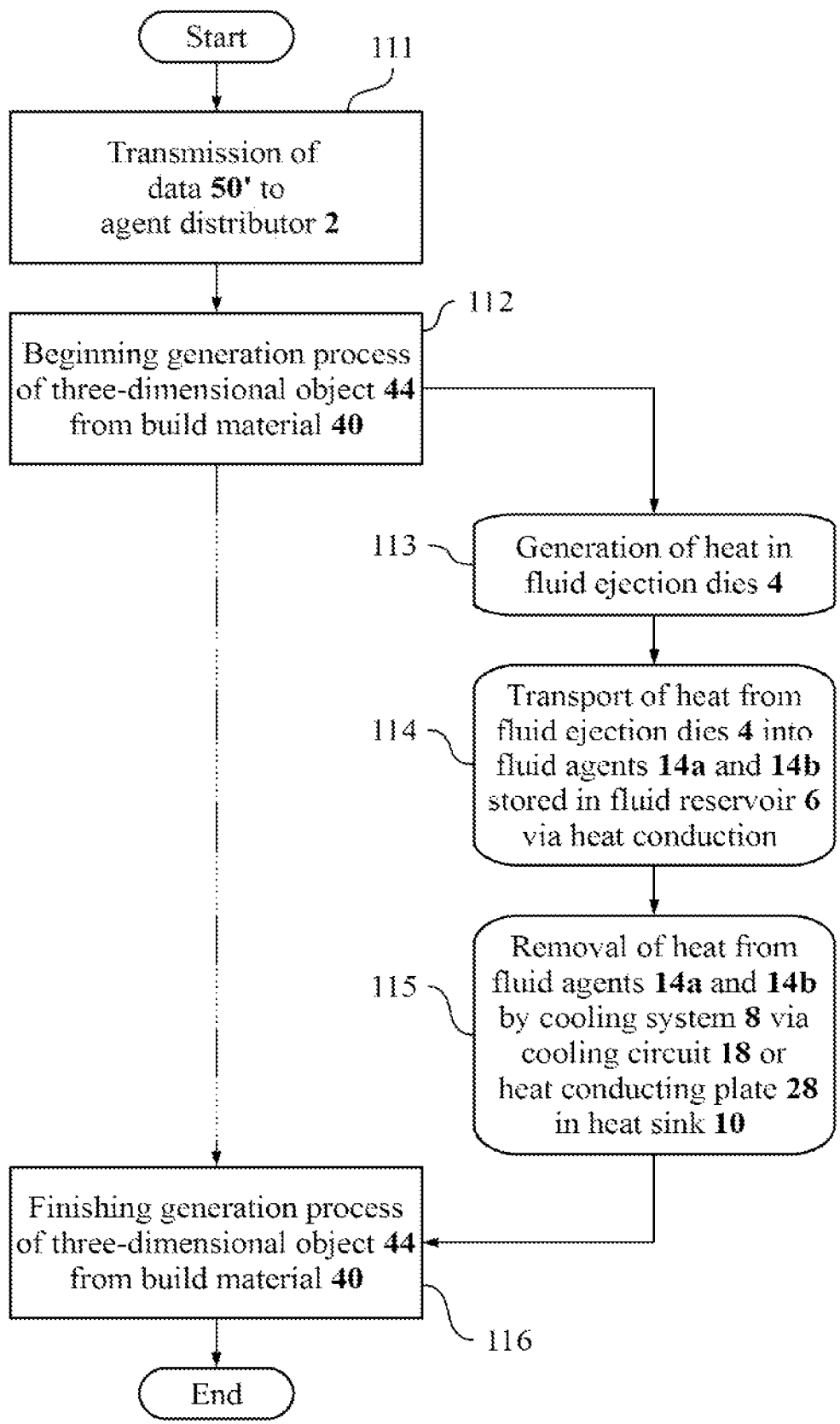
FIG. 11 provides a flow chart of a cooling process, according to an example, during an additive manufacturing process.

FIG. 11 provides a flowchart of a cooling process during an additive manufacturing process for a three-dimensional (3D) object 44. At reference numeral 111 the modified (print) data 50' of the additive manufacturing process described in conjunction with FIG. 10 may be transmitted to the agent distributor 2 via a data link between an output of the CPU 51 and a data transmission port 38 of the agent distributor 2.

At reference numeral 112 the generation of a three-dimensional (3D) object 44 to be printed may be started according to the additive manufacturing process of FIG. 10, i.e. build material 40 in the build material area 42 may be (pre-)heated and fluid agent 14 may be dispensed by fluid ejection dies 4 of agent distributor 2. In some examples, the pre-heating of build material 40 may also generate heat in at least one fluid ejection die 4, as indicated by reference numeral 113.

At reference numeral 114 at least part of the heat generated at the fluid ejection dies 4 may be transported into the fluid agents 14a and 14b stored in a fluid, reservoir inside the agent distributor 2 via heat conduction. In some examples the fluid reservoir 6 and the dedicated sections 16a, 16b therein may be adjacent to the fluid ejection dies 4, e.g. located directly above the dies 4.

At reference numeral 115 at least part of the heat transported from the fluid ejection dies 4 into the fluid agents 14 may be removed from at least one of the fluid agents 14. In some examples a heat sink 10 may be in direct contact with at least one of the fluid agents 14. In some example, a heat conducting plate 28 may be part of the heat sink 10 and may be in direct surface contact with, for example, the detailing agent 14*b*, as illustrated in more detail in FIG. 7*b*. In some examples, the heat sink 10 may be at least partially, or substantially be formed by a cooling circuit 18. In some examples, the cooling circuit 18 may be in direct surface contact with at least one of the fluid agents 14. By "surface contact" a wetting of the heat sink surface by the fluid agent 14 is to be understood.

In some examples, the heat generated at the fluid ejection dies 4 either through operation of the dies 4 or by heat radiation from the pre-heated build material 40 in the build material area 42, or from the electromagnetic radiation emitters 20, 22 may be removed from the agent distributor 2 by a cooling system 8, which comprises the heat sink 10. In some examples, the fluid ejection dies 4 may be cooled via an indirect thermal contact between the heat sink 10 and the fluid ejection dies 4; the indirect thermal contact being established by the fluid agent 14.

Until the additive manufacturing process of the three-dimensional (3D) object 44 from build material 40 in the build material area 42 is finished at reference numeral 116, the removal of heat according to the above description may be maintained. For some examples, the additive manufacturing process does not have to be interrupted due to a heat build-up in the agent distributor 2, e.g. at the fluid ejection dies 4.

It is to be understood that the examples disclosed herein are provided for illustrative purposes and are not to be construed as limiting the scope of the present disclosure.

The invention claimed is:

1. A method of cooling at least one agent distributor comprising at least one fluid ejection die, a fluid reservoir to store fluid agent, and a heat sink partially inside of the fluid reservoir and partially outside of the fluid reservoir, wherein the at least one fluid ejection die is in indirect thermal contact with the heat sink via the fluid agent, the method comprising:
    cooling the heat sink with a cooling fluid;
    removing heat from the fluid agent stored in the fluid reservoir via a direct thermal contact between the heat sink and the fluid agent; and
    removing heat from the at least one fluid ejection die by heat conduction via the direct thermal contact between the heat sink and the fluid agent.

2. An apparatus for generating a three-dimensional object comprising
    at least one-agent distributor comprising a fluid reservoir to store fluid agent and at least one fluid ejection die to selectively eject the fluid agent in a build material area; and
    a cooling system in a direct thermal contact with the fluid agent in the fluid reservoir to remove heat therefrom, wherein
    the cooling system comprises a heat sink that is partially inside of the fluid reservoir and partially outside of the fluid reservoir, and is to remove heat from the at least one fluid ejection die via the direct thermal contact between the heat sink and the fluid agent in the fluid reservoir.

3. The apparatus of claim 2 comprising at least one first electromagnetic radiation emitter to emit first radiation towards the build material area to pre-heat build material in the build material area, wherein the three-dimensional object is generated from the build material, wherein the at least one fluid ejection die is located above the build material area, and wherein the at least one fluid agent is cooled by the heat sink.

4. The apparatus of claim 2 further comprising at least one second electromagnetic radiation emitter to emit second radiation towards the build material area to fuse build material into a three-dimensional object, wherein
    the agent distributor selectively ejects a first fluid agent in at least one pattern defined in data received by the apparatus to generate at least one solidification portion of the build material corresponding to at least one cross section of the object to be generated and wherein the first fluid agent absorbs the second radiation of the second electromagnetic radiation emitter and converts the absorbed second radiation to thermal energy, thereby at least partially fusing the at least one solidification portion of the build material in proximity of the first fluid agent when exposed to the second radiation; and
    the agent distributor selectively ejects a second fluid agent in at least one farther pattern, wherein said further pattern comprises at least one detailing portion of the build material, the build material is exposed to the second radiation of the at least one second electromagnetic radiation emitter, wherein the second fluid agent at least partially prevents the build material in the at least one detailing portion to coalesce, thereby creating spaces in a completed object where the build material is less cohesive than untreated build material, such that a breakability of the build material along the at least one detailing portion is enhanced.

5. An agent distributor comprising at least one fluid ejection die, wherein
    the agent distributor comprises a heat sink and a fluid reservoir to store fluid agent, wherein the heat sink is partially inside of the fluid reservoir and partially outside of the fluid reservoir;
    the fluid agent is to be cooled by the heat sink via direct thermal contact between the fluid agent and the heat sink; and
    the at least one fluid ejection die is in indirect thermal contact with the heat sink via the fluid agent.

6. The agent distributor of claim 5, wherein the fluid reservoir is segmented vertically into at least two chambers extending horizontally by at least one partition wall to keep at least two individual fluid agents separated.

7. The agent distributor of claim 5, wherein
    the heat sink comprises a cooling circuit to cool the agent distributor from inside the fluid reservoir,
    a first agent distributor side panel comprises at least one opening, and
    at least one tube comprising cooling fluid extends through the at least one opening in the first agent distributor side panel to supply the cooling circuit with the cooling fluid.

8. The agent distributor of claim 7, wherein
    the cooling circuit is formed by the at least one tube;
    the cooling circuit extends through the fluid reservoir;
    the cooling circuit is passed through the at least one fluid agent; and
    the at least one fluid agent is cooled by heat conduction through the at least one tube.

9. The agent distributor of claim 8, wherein
    the at least one tube extends through the first agent distributor side panel;
    the at least one tube extends substantially horizontally through a first chamber of the fluid reservoir;
    the at least one tube passes from the first chamber of the fluid reservoir through at least one partition wall to a second chamber of the fluid reservoir, the at least one tube extends substantially horizontally through the second chamber of the fluid reservoir, and the at least one tube extends through a second opening in the first agent distributor side panel.

10. The agent distributor of claim 8, wherein a first tube extends through a first opening in a first agent distributor side panel;

the first tube extends substantially horizontally through a first chamber of the fluid reservoir:

the first tube passes through a third opening in a second agent distributor side panel;

a second tube extends through a second opening in the first agent distributor side panel;

the second tube extends substantially horizontally through a second chamber of the fluid reservoir; and the second tube passes through a fourth opening in the second agent distributor side panel.

11. The agent distributor of claim 10, wherein the heat sink comprises a heat conducting plate with fins embedded in a third agent distributor side panel extending substantially horizontally therealong and exposed to an interior and an exterior of the fluid reservoir.

12. The agent distributor of claim 11, wherein the fins on the exterior of the fluid reservoir are cooled by a coolant circuit or by ambient air.

13. The agent distributor of claim 8, wherein the heat sink comprises a heat conducting plate with fins embedded in a third agent distributor side panel extending substantially horizontally therealong and exposed to an interior and an exterior of the fluid reservoir, wherein the fins on the exterior of the fluid reservoir are cooled by a coolant circuit or by ambient air.

14. The agent distributor of claim 11, wherein the heat conducting plate with fins is insulated and/or passivated on the interior of the fluid reservoir, where the fins come in contact with the at least one printing agent, and wherein the heat conducting plate with fins is insulated and/or passivated on the exterior of the fluid reservoir, where the fins come in contact with a coolant of the coolant circuit.

15. The agent distributor of claim 5, wherein the at least one fluid ejection die is surrounded by a heat reflecting coating or a heat reflecting material that reflects heat radiation from a build material area below the agent distributor back onto the build material area.

* * * * *